(12) United States Patent
Gao et al.

(10) Patent No.: US 12,223,732 B2
(45) Date of Patent: Feb. 11, 2025

(54) SYSTEMS AND METHODS FOR OBJECT MONITORING

(71) Applicant: ZHEJIANG DAHUA TECHNOLOGY CO., LTD., Zhejiang (CN)

(72) Inventors: Lixun Gao, Hangzhou (CN); Zhenshan Lu, Hangzhou (CN); Zhewei Li, Hangzhou (CN); Tianfu Lan, Hangzhou (CN); Wenjin Zhang, Hangzhou (CN); Qing Zhan, Hangzhou (CN); Minglang Ying, Hangzhou (CN); Kexue Ma, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 450 days.

(21) Appl. No.: 17/647,989

(22) Filed: Jan. 14, 2022

(65) Prior Publication Data

US 2022/0139090 A1    May 5, 2022

Related U.S. Application Data

(63) Continuation of application No. PCT/CN2019/118318, filed on Nov. 14, 2019.

(30) Foreign Application Priority Data

Jul. 17, 2019 (CN) .......................... 201910647503.0

(51) Int. Cl.
*G06K 9/00*      (2022.01)
*G06T 7/20*      (2017.01)
(Continued)

(52) U.S. Cl.
CPC ................ *G06V 20/54* (2022.01); *G06T 7/20* (2013.01); *G06T 7/70* (2017.01); *G06V 10/22* (2022.01);
(Continued)

(58) Field of Classification Search
CPC ........ G06V 20/54; G06V 10/22; G06V 20/60; G06V 20/582; G06T 7/20; G06T 7/70;
(Continued)

(56) References Cited

U.S. PATENT DOCUMENTS

| 2002/0072847 A1 | 6/2002 | Trajkovic et al. |
| 2004/0222904 A1 | 11/2004 | Ciolli |
| 2014/0314275 A1 | 10/2014 | Edmondson et al. |

FOREIGN PATENT DOCUMENTS

| CA | 2796110 C | 11/2016 |
| CN | 102902955 A * | 1/2013 |

(Continued)

OTHER PUBLICATIONS

International Search Report in PCT/CN2019/118318 mailed on Apr. 15, 2020, 5 pages.

(Continued)

*Primary Examiner* — Xin Jia
(74) *Attorney, Agent, or Firm* — METIS IP LLC

(57) ABSTRACT

The present disclosure relates to systems and methods for object monitoring. The system may obtain at least one image associated with a predetermined region captured by a capture device. The system may obtain a predetermined traffic rule associated with the predetermined region, wherein the predetermined traffic rule is determined based on one or more predetermined images associated with the predetermined region. The system may identify at least one object in (Continued)

the at least one image. The system may monitor a traffic behavior of the at least one object based on the predetermined traffic rule.

18 Claims, 17 Drawing Sheets

(51) Int. Cl.
*G06T 7/70* (2017.01)
*G06V 10/22* (2022.01)
*G06V 20/54* (2022.01)
*G06V 20/60* (2022.01)
*G08G 1/017* (2006.01)

(52) U.S. Cl.
CPC ........... *G06V 20/60* (2022.01); *G08G 1/0175* (2013.01); *G06T 2207/30196* (2013.01); *G06T 2207/30232* (2013.01); *G06T 2207/30236* (2013.01); *G06T 2207/30241* (2013.01)

(58) Field of Classification Search
CPC . G06T 2207/30196; G06T 2207/30232; G06T 2207/30236; G06T 2207/30241; G08G 1/0175; G08G 1/0116; G08G 1/0133; G08G 1/0141; G08G 1/04; G08G 1/052; G08G 1/054; G08G 1/096716; G08G 1/096741; G08G 1/096775
See application file for complete search history.

(56) References Cited

FOREIGN PATENT DOCUMENTS

| CN | 106571038 A | | 4/2017 | |
|---|---|---|---|---|
| CN | 106886755 A | | 6/2017 | |
| CN | 108847031 A | | 11/2018 | |
| CN | 104464290 B | | 12/2018 | |
| CN | 109325424 A | | 2/2019 | |
| CN | 109584594 A | | 4/2019 | |
| CN | 109598943 A | * | 4/2019 | .......... G08G 1/0175 |
| CN | 109635645 A | | 4/2019 | |
| CN | 109686088 A | | 4/2019 | |
| CN | 109712406 A | | 5/2019 | |
| EP | 1143395 A2 | | 10/2001 | |
| WO | 2005091243 A1 | | 9/2005 | |
| WO | 2007110944 A1 | | 10/2007 | |
| WO | 2021008039 A1 | | 1/2021 | |

OTHER PUBLICATIONS

Written Opinion in PCT/CN2019/118318 mailed on Apr. 15, 2020, 5 pages.
First Office Action in Chinese Application No. 201910647503.0 mailed on May 25, 2020, 20 pages.
The Extended European Search Report in European Application No. 19937829.0 mailed on Jun. 22, 2022, 10 pages.

* cited by examiner

SYSTEMS AND METHODS FOR OBJECT MONITORING

CROSS-REFERENCE TO RELATED APPLICATIONS

This application is a Continuation of International Application No. PCT/CN2019/118318, filed on Nov. 14, 2019, which claims priority to Chinese Patent Application No. 201910647503.0 filed on Jul. 17, 2019, the contents of each of which are incorporated herein by reference in their entirety.

TECHNICAL FIELD

The present disclosure generally relates to traffic monitoring technology, and in particular, to systems and methods for monitoring a traffic behavior of at least one object.

BACKGROUND

With the development of communication and multimedia technologies, the exploration of traffic monitoring has developed rapidly nowadays. Commonly, a traffic monitoring system can monitor a traffic behavior of an object (e.g., a vehicle, a pedestrian) by comparing status information (e.g., location information, velocity information) of the object with a traffic rule. However, in some situations, the traffic rule is determined manually by a technician, which improves the cost and complexity of the traffic monitoring and reduces the efficiency and accuracy of the traffic monitoring. Therefore, it is desirable to provide systems and methods for monitoring the traffic behavior of the object efficiently and accurately.

SUMMARY

An aspect of the present disclosure relates to a system for object monitoring. The system may include at least one storage medium including a set of instructions and at least one processor in communication with the at least one storage medium. When executing the set of instructions, the at least one processor may be directed to cause the system to obtain at least one image associated with a predetermined region captured by a capture device; obtain a predetermined traffic rule associated with the predetermined region, wherein the predetermined traffic rule is determined based on one or more predetermined images associated with the predetermined region; identify at least one object in the at least one image; and monitor a traffic behavior of the at least one object based on the predetermined traffic rule.

In some embodiments, the capture device may include a camera, a video recorder, and/or a sensor.

In some embodiments, to obtain the predetermined traffic rule associated with the predetermined region, the at least one processor may be directed to cause the system to extract one or more traffic signs in the one or more predetermined images associated with the predetermined region and determine the predetermined traffic rule associated with the predetermined region based on the one or more traffic signs.

In some embodiments, the one or more traffic signs may include a lane line, an indicator sign, a color of a traffic light, and/or a speed limit sign.

In some embodiments, to monitor the traffic behavior of the at least one object based on the predetermined traffic rule, the at least one processor may be directed to cause the system to determine status information associated with the at least object based on the at least one image and monitor the traffic behavior of the at least one object based on the status information according to the predetermined traffic rule.

In some embodiments, the status information associated with the at least object may include a type of the at least one object, location information of the at least one object, velocity information of the at least one object, a moving path of the at least one object, and/or a moving direction of the at least one object.

In some embodiments, to monitor the traffic behavior of the at least one object based on the status information according to the predetermined traffic rule, for each of the at least one object, the at least one processor may be directed to cause the system further to determine whether the traffic behavior of the object violates the predetermined traffic rule based on the status information of the object and transmit event information associated with the traffic behavior of the object to a target device in response to determining that the traffic behavior of the object violates the predetermined traffic rule.

In some embodiments, the event information associated with the traffic behavior of the object may include at least one image corresponding to the object, the status information of the object, location information associated with the predetermined region, and/or a traffic violation type.

In some embodiments, the target device may include a traffic management department, a data center, an alarm center, and/or a terminal device associated with the object.

In some embodiments, to monitor the traffic behavior of the at least one object based on the status information according to the predetermined traffic rule, for each of the at least one object, the at least one processor may be directed to cause the system further to determine whether the traffic behavior of the object satisfies a predetermined condition based on the status information according to the predetermined traffic rule and transmit reminder information to a terminal device associated with the object in response to determining that the traffic behavior of the object satisfies the predetermined condition.

In some embodiments, the at least one object may include a vehicle and/or a pedestrian.

In some embodiments, the at least one processor may be directed to cause the system further to store the at least one image associated with the predetermined region into a storage device according to a predetermined time interval.

A further aspect of the present disclosure relates to a method implemented on a computing device including at least one processor, at least one storage medium, and a communication platform connected to a network. The method may include obtaining at least one image associated with a predetermined region captured by a capture device; obtaining a predetermined traffic rule associated with the predetermined region, wherein the predetermined traffic rule is determined based on one or more predetermined images associated with the predetermined region; identifying at least one object in the at least one image; and monitoring a traffic behavior of the at least one object based on the predetermined traffic rule.

In some embodiments, the capture device may include a camera, a video recorder, and/or a sensor.

In some embodiments, the obtaining the predetermined traffic rule associated with the predetermined region may include extracting one or more traffic signs in the one or more predetermined images associated with the predetermined region and determining the predetermined traffic rule associated with the predetermined region based on the one or more traffic signs.

In some embodiments, the one or more traffic signs may include a lane line, an indicator sign, a color of a traffic light, and/or a speed limit sign.

In some embodiments, the monitoring the traffic behavior of the at least one object based on the predetermined traffic rule may include determining status information associated with the at least object based on the at least one image and monitoring the traffic behavior of the at least one object based on the status information according to the predetermined traffic rule.

In some embodiments, the status information associated with the at least object may include a type of the at least one object, location information of the at least one object, velocity information of the at least one object, a moving path of the at least one object, and/or a moving direction of the at least one object.

In some embodiments, the monitoring the traffic behavior of the at least one object based on the status information according to the predetermined traffic rule may include, for each of the at least one object, determining whether the traffic behavior of the object violates the predetermined traffic rule based on the status information of the object and transmitting event information associated with the traffic behavior of the object to a target device in response to determining that the traffic behavior of the object violates the predetermined traffic rule.

In some embodiments, the event information associated with the traffic behavior of the object may include at least one image corresponding to the object, the status information of the object, location information associated with the predetermined region, and/or a traffic violation type.

In some embodiments, the target device may include a traffic management department, a data center, an alarm center, and/or a terminal device associated with the object.

In some embodiments, the monitoring the traffic behavior of the at least one object based on the status information according to the predetermined traffic rule may include, for each of the at least one object, determining whether the traffic behavior of the object satisfies a predetermined condition based on the status information according to the predetermined traffic rule and transmitting reminder information to a terminal device associated with the object in response to determining that the traffic behavior of the object satisfies the predetermined condition.

In some embodiments, the at least one object may include a vehicle and/or a pedestrian.

In some embodiments, the method further may include storing the at least one image associated with the predetermined region into a storage device according to a predetermined time interval.

A still further aspect of the present disclosure relates to a system for monitoring an object. The system may include a first obtaining module, a second obtaining module, an identification module, and a monitoring module. The first obtaining module may be configured to obtain at least one image associated with a predetermined region captured by a capture device. The second obtaining module may be configured to obtain a predetermined traffic rule associated with the predetermined region, wherein the predetermined traffic rule is determined based on one or more predetermined images associated with the predetermined region. The identification module may be configured to identify at least one object in the at least one image. The monitoring module may be configured to monitor a traffic behavior of the at least one object based on the predetermined traffic rule.

In some embodiments, the capture device may include a camera, a video recorder, and/or a sensor.

In some embodiments, the second obtaining module may be further configured to extract one or more traffic signs in the one or more predetermined images associated with the predetermined region and determine the predetermined traffic rule associated with the predetermined region based on the one or more traffic signs.

In some embodiments, the one or more traffic signs may include a lane line, an indicator sign, a color of a traffic light, and/or a speed limit sign.

In some embodiments, the monitoring module may be further configured to determine status information associated with the at least object based on the at least one image and monitor the traffic behavior of the at least one object based on the status information according to the predetermined traffic rule.

In some embodiments, the status information associated with the at least object may include a type of the at least one object, location information of the at least one object, velocity information of the at least one object, a moving path of the at least one object, and/or a moving direction of the at least one object.

In some embodiments, the monitoring module may be further configured to, for each of the at least one object, determine whether the traffic behavior of the object violates the predetermined traffic rule based on the status information of the object and transmit event information associated with the traffic behavior of the object to a target device in response to determining that the traffic behavior of the object violates the predetermined traffic rule.

In some embodiments, the event information associated with the traffic behavior of the object may include at least one image corresponding to the object, the status information of the object, location information associated with the predetermined region, and/or a traffic violation type.

In some embodiments, the target device may include a traffic management department, a data center, an alarm center, and/or a terminal device associated with the object.

In some embodiments, the monitoring module may be further configured to, for each of the at least one object, determine whether the traffic behavior of the object satisfies a predetermined condition based on the status information according to the predetermined traffic rule and transmit reminder information to a terminal device associated with the object in response to determining that the traffic behavior of the object satisfies the predetermined condition.

In some embodiments, the at least one object may include a vehicle and/or a pedestrian.

In some embodiments, the first obtaining module may be further configured to store the at least one image associated with the predetermined region into a storage device according to a predetermined time interval.

A still further aspect of the present disclosure relates to a non-transitory computer readable medium including executable instructions. When the executable instructions are executed by at least one processor, the executable instructions may direct the at least one processor to perform a method. The method may include obtaining at least one image associated with a predetermined region captured by a capture device; obtaining a predetermined traffic rule associated with the predetermined region, wherein the predetermined traffic rule is determined based on one or more predetermined images associated with the predetermined region; identifying at least one object in the at least one image; and monitoring a traffic behavior of the at least one object based on the predetermined traffic rule.

A still further aspect of the present disclosure relates to a system for object monitoring. The system may include at least one storage medium including a set of instructions and at least one processor in communication with the at least one storage medium. When executing the set of instructions, the at least one processor may be directed to cause the system to obtain at least one image associated with a predetermined region captured by a capture device; extract one or more traffic signs in the at least one image; determine a traffic rule based on the one or more traffic signs; and monitor a traffic behavior of at least one object associated with the predetermined region based on the traffic rule.

In some embodiments, the capture device may include a camera, a video recorder, and/or a sensor.

In some embodiments, the one or more traffic signs may include a lane line, an indicator sign, a color of a traffic light, and/or a speed limit sign.

In some embodiments, to monitor the traffic behavior of the at least one object associated with the predetermined region based on the traffic rule, the at least one processor may be directed to cause the system further to determine status information associated with the at least one object based on the at least one image and monitor the traffic behavior of the at least one object based on the status information according to the traffic rule.

In some embodiments, the status information associated with the at least object may include a type of the at least one object, location information of the at least one object, velocity information of the at least one object, a moving path of the at least one object, and/or a moving direction of the at least one object.

In some embodiments, to monitor the traffic behavior of the at least one object based on the status information according to the traffic rule, for each of the at least one object, the at least one processor may be directed to cause the system further to determine whether the traffic behavior of the object violates the traffic rule based on the status information of the object and in response to determining that the traffic behavior of the object violates the traffic rule, transmit event information associated with the traffic behavior of the object to a target device.

In some embodiments, the event information associated with the traffic behavior of the object may include at least one image corresponding to the object, the status information of the object, location information associated with the predetermined region, and/or a traffic violation type.

In some embodiments, the target device may include a traffic management department, a data center, an alarm center, and/or a terminal device associated with the object.

In some embodiments, to monitor the traffic behavior of the at least one object based on the status information according to the traffic rule, for each of the at least one object, the at least one processor may be directed to cause the system further to determine whether the traffic behavior of the object satisfies a predetermined condition based on the status information according to the traffic rule and transmit reminder information to a terminal device associated with the object in response to determining that the traffic behavior of the object satisfies the predetermined condition.

In some embodiments, the at least one object may include a vehicle and/or a pedestrian.

In some embodiments, the at least one processor may be directed to cause the system further to store the at least one image associated with the predetermined region into a storage device according to a predetermined time interval.

A further aspect of the present disclosure relates to a method implemented on a computing device including at least one processor, at least one storage medium, and a communication platform connected to a network. The method may include obtaining at least one image associated with a predetermined region captured by a capture device; extracting one or more traffic signs in the at least one image; determining a traffic rule based on the one or more traffic signs; and monitoring a traffic behavior of at least one object associated with the predetermined region based on the traffic rule.

In some embodiments, the capture device may include a camera, a video recorder, and/or a sensor.

In some embodiments, the one or more traffic signs may include a lane line, an indicator sign, a color of a traffic light, and/or a speed limit sign.

In some embodiments, the monitoring the traffic behavior of the at least one object associated with the predetermined region based on the traffic rule may include determining status information associated with the at least one object based on the at least one image and monitoring the traffic behavior of the at least one object based on the status information according to the traffic rule.

In some embodiments, the status information associated with the at least object may include a type of the at least one object, location information of the at least one object, velocity information of the at least one object, a moving path of the at least one object, and/or a moving direction of the at least one object.

In some embodiments, the monitoring the traffic behavior of the at least one object based on the status information according to the traffic rule may include, for each of the at least one object, determining whether the traffic behavior of the object violates the traffic rule based on the status information of the object and transmitting event information associated with the traffic behavior of the object to a target device in response to determining that the traffic behavior of the object violates the traffic rule.

In some embodiments, the event information associated with the traffic behavior of the object may include at least one image corresponding to the object, the status information of the object, location information associated with the predetermined region, and/or a traffic violation type.

In some embodiments, the target device may include a traffic management department, a data center, an alarm center, and/or a terminal device associated with the object.

In some embodiments, the monitoring the traffic behavior of the at least one object based on the status information according to the traffic rule may include, for each of the at least one object, determining whether the traffic behavior of the object satisfies a predetermined condition based on the status information according to the traffic rule and transmitting reminder information to a terminal device associated with the object in response to determining that the traffic behavior of the object satisfies the predetermined condition.

In some embodiments, the at least one object may include a vehicle and/or a pedestrian.

In some embodiments, the method may further include storing the at least one image associated with the predetermined region into a storage device according to a predetermined time interval.

A still further aspect of the present disclosure relates to a system for object monitoring. The system may include an image obtaining module, an extraction module, a traffic rule determination module, and a monitoring module. The image obtaining module may be configured to obtain at least one image associated with a predetermined region captured by a capture device. The extraction module may be configured to extract one or more traffic signs in the at least one image. The traffic rule determination module may be configured to determine a traffic rule based on the one or more traffic signs.

The monitoring module may be configured to monitor a traffic behavior of at least one object associated with the predetermined region based on the traffic rule.

In some embodiments, the capture device may include a camera, a video recorder, and/or a sensor.

In some embodiments, the one or more traffic signs may include a lane line, an indicator sign, a color of a traffic light, and/or a speed limit sign.

In some embodiments, the monitoring module may be further configured to determine status information associated with the at least one object based on the at least one image and monitor the traffic behavior of the at least one object based on the status information according to the traffic rule.

In some embodiments, the status information associated with the at least object may include a type of the at least one object, location information of the at least one object, velocity information of the at least one object, a moving path of the at least one object, and/or a moving direction of the at least one object.

In some embodiments, the monitoring module may be further configured to, for each of the at least one object, determine whether the traffic behavior of the object violates the traffic rule based on the status information of the object and transmit event information associated with the traffic behavior of the object to a target device in response to determining that the traffic behavior of the object violates the traffic rule.

In some embodiments, the event information associated with the traffic behavior of the object may include at least one image corresponding to the object, the status information of the object, location information associated with the predetermined region, and/or a traffic violation type.

In some embodiments, the target device may include a traffic management department, a data center, an alarm center, and/or a terminal device associated with the object.

In some embodiments, the monitoring module may be further configured to, for each of the at least one object, determine whether the traffic behavior of the object satisfies a predetermined condition based on the status information according to the traffic rule and transmit reminder information to a terminal device associated with the object in response to determining that the traffic behavior of the object satisfies the predetermined condition.

In some embodiments, the at least one object may include a vehicle and/or a pedestrian.

In some embodiments, the image obtaining module may be further configured to store the at least one image associated with the predetermined region into a storage device according to a predetermined time interval.

A still further aspect of the present disclosure relates to a non-transitory computer readable medium including executable instructions. When the executable instructions are executed by at least one processor, the executable instructions may direct the at least one processor to perform a method. The method may include obtaining at least one image associated with a predetermined region captured by a capture device; extracting one or more traffic signs in the at least one image; determining a traffic rule based on the one or more traffic signs; and monitoring a traffic behavior of at least one object associated with the predetermined region based on the traffic rule.

A still further aspect of the present disclosure relates to a system for determining a predetermined traffic rule. The system may include at least one storage medium including a set of instructions and at least one processor in communication with the at least one storage medium. When executing the set of instructions, the at least one processor may be directed to cause the system to obtain one or more predetermined images associated with a predetermined region captured by a capture device; extract one or more traffic signs in the one or more predetermined images; and determine a predetermined traffic rule associated with the predetermined region based on the one or more traffic signs.

In some embodiments, the capture device may include a camera, a video recorder, and/or a sensor.

In some embodiments, the one or more traffic signs may include a lane line, an indicator sign, a color of a traffic light, and/or a speed limit sign.

In some embodiments, the at least one processor may be directed to cause the system further to identify at least one object in the at least one image and monitor a traffic behavior of the at least one object based on the predetermined traffic rule.

In some embodiments, to monitor the traffic behavior of the at least one object based on the predetermined traffic rule, the at least one processor may be directed to cause the system to determine status information associated with the at least object based on the at least one image and monitor the traffic behavior of the at least one object based on the status information according to the predetermined traffic rule.

In some embodiments, the status information associated with the at least object may include a type of the at least one object, location information of the at least one object, velocity information of the at least one object, a moving path of the at least one object, and/or a moving direction of the at least one object.

In some embodiments, to monitor the traffic behavior of the at least one object based on the status information according to the predetermined traffic rule, for each of the at least one object, the at least one processor may be directed to cause the system further to determine whether the traffic behavior of the object violates the predetermined traffic rule based on the status information of the object and transmit event information associated with the traffic behavior of the object to a target device in response to determining that the traffic behavior of the object violates the predetermined traffic rule.

In some embodiments, the event information associated with the traffic behavior of the object may include at least one image corresponding to the object, the status information of the object, location information associated with the predetermined region, and/or a traffic violation type.

In some embodiments, the target device may include a traffic management department, a data center, an alarm center, and/or a terminal device associated with the object.

In some embodiments, to monitor the traffic behavior of the at least one object based on the status information according to the predetermined traffic rule, for each of the at least one object, the at least one processor may be directed to cause the system further to determine whether the traffic behavior of the object satisfies a predetermined condition based on the status information according to the predetermined traffic rule and transmit reminder information to a terminal device associated with the object in response to determining that the traffic behavior of the object satisfies the predetermined condition.

In some embodiments, the at least one object may include a vehicle and/or a pedestrian.

In some embodiments, the at least one processor may be directed to cause the system further to store the at least one image associated with the predetermined region into a storage device according to a predetermined time interval.

A further aspect of the present disclosure relates to a method implemented on a computing device including at least one processor, at least one storage medium, and a communication platform connected to a network. The method may include obtaining one or more predetermined images associated with a predetermined region captured by a capture device; extracting one or more traffic signs in the one or more predetermined images; and determining a predetermined traffic rule associated with the predetermined region based on the one or more traffic signs.

In some embodiments, the capture device may include a camera, a video recorder, and/or a sensor.

In some embodiments, the one or more traffic signs may include a lane line, an indicator sign, a color of a traffic light, and/or a speed limit sign.

In some embodiments, the method may further include identifying at least one object in the at least one image and monitoring a traffic behavior of the at least one object based on the predetermined traffic rule.

In some embodiments, the monitoring the traffic behavior of the at least one object based on the predetermined traffic rule may include determining status information associated with the at least object based on the at least one image and monitoring the traffic behavior of the at least one object based on the status information according to the predetermined traffic rule.

In some embodiments, the status information associated with the at least object may include a type of the at least one object, location information of the at least one object, velocity information of the at least one object, a moving path of the at least one object, and/or a moving direction of the at least one object.

In some embodiments, the monitoring the traffic behavior of the at least one object based on the status information according to the predetermined traffic rule may include, for each of the at least one object, determining whether the traffic behavior of the object violates the predetermined traffic rule based on the status information of the object and transmitting event information associated with the traffic behavior of the object to a target device in response to determining that the traffic behavior of the object violates the predetermined traffic rule.

In some embodiments, the event information associated with the traffic behavior of the object may include at least one image corresponding to the object, the status information of the object, location information associated with the predetermined region, and/or a traffic violation type.

In some embodiments, the target device may include a traffic management department, a data center, an alarm center, and/or a terminal device associated with the object.

In some embodiments, the monitoring the traffic behavior of the at least one object based on the status information according to the predetermined traffic rule may include, for each of the at least one object, determining whether the traffic behavior of the object satisfies a predetermined condition based on the status information according to the predetermined traffic rule and transmitting reminder information to a terminal device associated with the object in response to determining that the traffic behavior of the object satisfies the predetermined condition.

In some embodiments, the at least one object may include a vehicle and/or a pedestrian.

In some embodiments, the method may further include storing the at least one image associated with the predetermined region into a storage device according to a predetermined time interval.

A still further aspect of the present disclosure relates to a system for determining a predetermined traffic rule. The system may include an image obtaining module, an extraction module, and a traffic rule determination module. The image obtaining module may be configured to obtain one or more predetermined images associated with a predetermined region captured by a capture device. The extraction module may be configured to extract one or more traffic signs in the one or more predetermined images. The traffic rule determination module may be configured to determine a predetermined traffic rule associated with the predetermined region based on the one or more traffic signs.

In some embodiments, the capture device may include a camera, a video recorder, and/or a sensor.

In some embodiments, the one or more traffic signs may include a lane line, an indicator sign, a color of a traffic light, and/or a speed limit sign.

In some embodiments, the system may further include a monitoring module configured to identify at least one object in the at least one image and monitor a traffic behavior of the at least one object based on the predetermined traffic rule.

In some embodiments, the monitoring module may be further configured to determine status information associated with the at least object based on the at least one image and monitor the traffic behavior of the at least one object based on the status information according to the predetermined traffic rule.

In some embodiments, the status information associated with the at least object may include a type of the at least one object, location information of the at least one object, velocity information of the at least one object, a moving path of the at least one object, and/or a moving direction of the at least one object.

In some embodiments, the monitoring module may be further configured to, for each of the at least one object, determine whether the traffic behavior of the object violates the predetermined traffic rule based on the status information of the object and transmit event information associated with the traffic behavior of the object to a target device in response to determining that the traffic behavior of the object violates the predetermined traffic rule.

In some embodiments, the event information associated with the traffic behavior of the object may include at least one image corresponding to the object, the status information of the object, location information associated with the predetermined region, and/or a traffic violation type.

In some embodiments, the target device may include a traffic management department, a data center, an alarm center, and/or a terminal device associated with the object.

In some embodiments, the monitoring module may be further configured to, for each of the at least one object, determine whether the traffic behavior of the object satisfies a predetermined condition based on the status information according to the predetermined traffic rule and transmit reminder information to a terminal device associated with the object in response to determining that the traffic behavior of the object satisfies the predetermined condition.

In some embodiments, the at least one object may include a vehicle and/or a pedestrian.

In some embodiments, the image obtaining module may be further configured to store the at least one image associated with the predetermined region into a storage device according to a predetermined time interval.

A still further aspect of the present disclosure relates to a non-transitory computer readable medium including executable instructions. When the executable instructions are executed by at least one processor, the executable instructions may direct the at least one processor to perform a method. The method may include obtaining one or more predetermined images associated with a predetermined region captured by a capture device; extracting one or more traffic signs in the one or more predetermined images; and determining a predetermined traffic rule associated with the predetermined region based on the one or more traffic signs.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
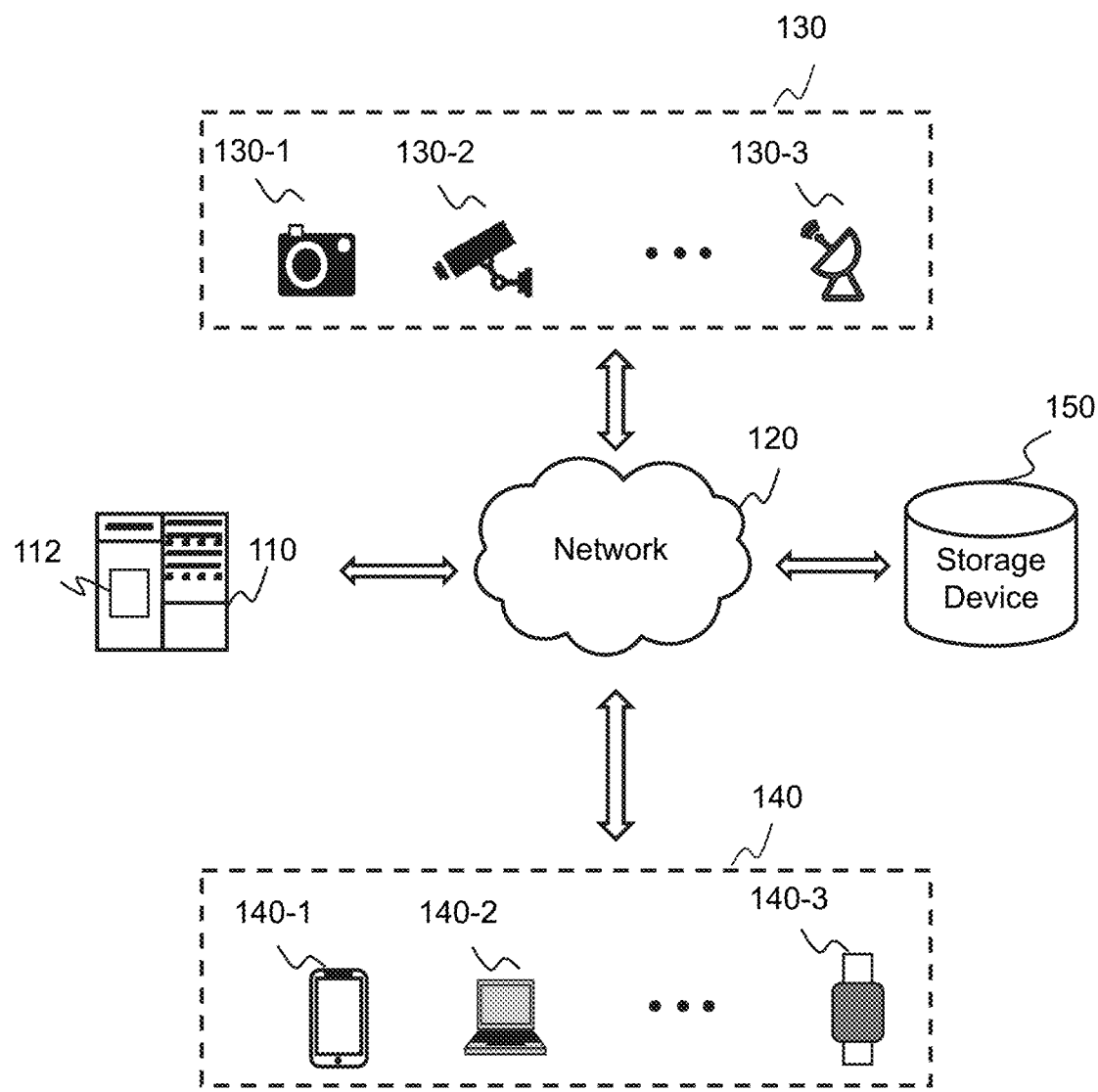
FIG. 1 is a schematic diagram illustrating an exemplary traffic monitoring system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the terms "system," "engine," "unit," "module," and/or "block" used herein are one method to distinguish different components, elements, parts, sections, or assemblies of different levels in ascending order. However, the terms may be displaced by other expression if they may achieve the same purpose.

Generally, the words "module," "unit," or "block" used herein, refer to logic embodied in hardware or firmware, or to a collection of software instructions. A module, a unit, or a block described herein may be implemented as software and/or hardware and may be stored in any type of non-transitory computer-readable medium or other storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 220 illustrated in FIG. 2) may be provided on a computer readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules (or units or blocks) may be included in connected logic components, such as gates and flip-flops, and/or can be included in programmable units, such as programmable gate arrays or processors. The modules (or units or blocks) or computing device functionality described herein may be implemented as software modules (or units or blocks), but may be represented in hardware or firmware. In general, the modules (or units or blocks) described herein refer to logical modules (or units or blocks) that may be combined with other modules (or units or blocks) or divided into sub-modules (or sub-units or sub-blocks) despite their physical organization or storage.

It will be understood that when a unit, an engine, a module, or a block is referred to as being "on," "connected to," or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

In addition, it should be understood that in the description of the present disclosure, the terms "first", "second", or the like, are only used for the purpose of differentiation, and cannot be interpreted as indicating or implying relative importance, nor can be understood as indicating or implying the order.

The flowcharts used in the present disclosure illustrate operations that systems implement according to some embodiments of the present disclosure. It is to be expressly understood, the operations of the flowcharts may be implemented not in order. Conversely, the operations may be implemented in an inverted order, or simultaneously. Moreover, one or more other operations may be added to the flowcharts. One or more operations may be removed from the flowcharts.

An aspect of the present disclosure relates to systems and methods for object monitoring. The system may obtain at least one image associated with a predetermined region (e.g., a capture range of the capture device) captured by a capture device (e.g., a camera, a video recorder, a sensor) and a predetermined traffic rule associated with the predetermined region. Further, the system may identify at least one object (e.g., a vehicle, a pedestrian) in the at least one image and monitor a traffic behavior of the at least one object based on the predetermined traffic rule. For example, the system may determine whether the traffic behavior of the at least one object violates the predetermined traffic rule.

The predetermined traffic rule may be determined based on one or more predetermined images associated with the predetermined region. For example, the system may extract one or more traffic signs (e.g., a lane line, an indicator sign, a color of a traffic light, a speed limit sign) in the one or more predetermined images and determine the predetermined traffic rule associated with the predetermined region based on the one or more traffic signs. The one or more predetermined images may be pre-stored in a storage device and the predetermined traffic rule may be generated offline based on the one or more predetermined images. Additionally or alternatively, the one or more predetermined images may be captured in real time (which can be considered that the one or more predetermined images are the same as the at least one image associated with the predetermined region) and the predetermined traffic rule may be generated in real time. According to the systems and methods of the present disclosure, a traffic rule associated with a predetermined region can be automatically generated based on images associated with the predetermined region, thereby improving the efficiency and accuracy of the traffic monitoring.

FIG. 1 is a schematic diagram illustrating an exemplary traffic monitoring system according to some embodiments of the present disclosure. As shown, the traffic monitoring system 100 may include a server 110, a network 120, an acquisition device (also referred to as a "capture device" or an "image capture device") 130, a user device (also referred to as a "terminal device") 140, and a storage device 150.

The server 110 may be a single server or a server group. The server group may be centralized or distributed (e.g., the server 110 may be a distributed system). In some embodiments, the server 110 may be local or remote. For example, the server 110 may access information and/or data stored in the acquisition device 130, the user device 140, and/or the storage device 150 via the network 120. As another example, the server 110 may be directly connected to the acquisition device 130, the user device 140, and/or the storage device 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 including one or more components illustrated in FIG. 2 of the present disclosure.

In some embodiments, the server 110 may include a processing device 112. The processing device 112 may process information and/or data relating to traffic monitoring to perform one or more functions described in the present disclosure. For example, the processing device 112 may obtain at least one image associated with a predetermined region and a predetermined traffic rule associated with the predetermined region. Further, the processing device 112 may identify at least one object in the at least one image and monitor a traffic behavior of the at least one object based on the predetermined traffic rule. As another example, in order to determine the predetermined traffic rule, the processing device 112 may obtain one or more predetermined images associated with the predetermined region and extract one or more traffic signs in the one or more predetermined images. Further, the processing device 112 may determine the predetermined traffic rule associated with the predetermined region based on the one or more traffic signs. As a further example, the processing device 112 may obtain at least one image associated with a predetermined region and extract one or more traffic signs in the at least one image. Further, the processing device 112 may determine a traffic rule based on the one or more traffic signs and monitor a traffic behavior of at least one object associated with the predetermined region based on the traffic rule. In some embodiments, the processing device 112 may include one or more processing devices (e.g., single-core processing device(s) or multi-core processor(s)). Merely by way of example, the processing device 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

In some embodiment, the sever 110 may be unnecessary and all or part of the functions of the server 110 may be implemented by other components (e.g., the acquisition device 130, the user device 140) of the traffic monitoring system 100. For example, the processing device 112 may be integrated into the acquisition device 130 or the user device 140 and the functions (e.g., monitoring a traffic behavior of an object) of the processing device 112 may be implemented by the acquisition device 130 or the user device 140.

The network 120 may facilitate exchange of information and/or data for the traffic monitoring system 100. In some embodiments, one or more components (e.g., the server 110, the acquisition device 130, the user device 140, the storage device 150) of the traffic monitoring system 100 may transmit information and/or data to other component(s) of the traffic monitoring system 100 via the network 120. For example, the server 110 may obtain at least one image associated with a predetermined region from the acquisition device 130 via the network 120. As another example, the server 110 may obtain a predetermined traffic rule associated with the predetermined region from the storage device 150. In some embodiments, the network 120 may be any type of wired or wireless network, or combination thereof. Merely by way of example, the network 120 may include a cable network (e.g., a coaxial cable network), a wireline network, an optical fiber network, a telecommunications network, an intranet, an Internet, a local area network (LAN), a wide area network (WAN), a wireless local area network (WLAN), a metropolitan area network (MAN), a public telephone switched network (PSTN), a Bluetooth network, a ZigBee network, a near field communication (NFC) network, or the like, or any combination thereof.

The acquisition device 130 may be configured to acquire at least one image (the "image" herein refers to a single image or a frame of a video). In some embodiments, the acquisition device 130 may include a camera 130-1, a video recorder 130-2, a sensor 130-3, etc. The camera 130-1 may include a gun camera, a dome camera, an integrated camera, a monocular camera, a binocular camera, a multi-view camera, or the like, or any combination thereof. The video recorder 130-2 may include a PC Digital Video Recorder (DVR), an embedded DVR, or the like, or any combination thereof. The sensor 130-1 may include an acceleration sensor (e.g., a piezoelectric sensor), a velocity sensor (e.g., a Hall sensor), a distance sensor (e.g., a radar, an infrared sensor), a steering angle sensor (e.g., a tilt sensor), a traction-related sensor (e.g., a force sensor), or the like, or any combination thereof. The at least one image acquired by the acquisition device 130 may be a two-dimensional image, a three-dimensional image, a four-dimensional image, etc. In some embodiments, the acquisition device 130 may include a plurality of components each of which can acquire an image. For example, the acquisition device 130 may include a plurality of sub-cameras that can capture images or videos simultaneously. In some embodiments, the acquisition device 130 may transmit the acquired image to one or more components (e.g., the server 110, the user device 140, the storage device 150) of the traffic monitoring system 100 via the network 120.

The user device 140 may be configured to receive information and/or data from the server 110, the acquisition device 130, and/or the storage device 150 via the network 120. For example, the user device 140 may receive event information (e.g., at least one image corresponding to the at least one object, a traffic violation type) associated with a traffic behavior of at least one object from the server 110. As another example, the user device 140 may receive reminder information (e.g., a current status of the at least one object, a moving recommendation) from the server 110. In some embodiments, the user device 140 may provide a user interface via which a user may view information and/or input data and/or instructions to the traffic monitoring system 100. For example, the user may view event information associated with the traffic behavior of the at least one object obtained from the server 110 via the user interface. As another example, the user may input an instruction associated with a traffic monitoring parameter via the user interface. In some embodiments, the user device 140 may include a mobile phone 140-1, a computer 140-2, a wearable device 140-3, or the like, or any combination thereof. In some embodiments, the user device 140 may include a display that can display information in a human-readable form, such as text, image, audio, video, graph, animation, or the like, or any combination thereof. The display of the user device 140 may include a cathode ray tube (CRT) display, a liquid crystal display (LCD), a light emitting diode (LED) display, a plasma display panel (PDP), a three dimensional (3D) display, or the like, or a combination thereof. In some embodiments, the user device 140 may be connected to one or more components (e.g., the server 110, the acquisition device 130, the storage device 150) of the traffic monitoring system 100 via the network 120.

The storage device 150 may be configured to store data and/or instructions. The data and/or instructions may be obtained from, for example, the server 110, the acquisition device 130, and/or any other component of the traffic monitoring system 100. In some embodiments, the storage device 150 may store data and/or instructions that the server 110 may execute or use to perform exemplary methods described in the present disclosure. For example, the storage device 150 may store one or more predetermined images acquired by the acquisition device 130 and a predetermined traffic rule determined based on the one or more predetermined images. In some embodiments, the storage device 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to communicate with one or more components (e.g., the server 110, the acquisition device 130, the user device 140) of the traffic monitoring system 100. One or more components of the traffic monitoring system 100 may access the data or instructions stored in the storage device 150 via the network 120. In some embodiments, the storage device 150 may be directly connected to or communicate with one or more components (e.g., the server 110, the acquisition device 130, the user device 140) of the traffic monitoring system 100. In some embodiments, the storage device 150 may be part of other components of the traffic monitoring system 100, such as the server 110, the acquisition device 130, or the user device 140.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 2:
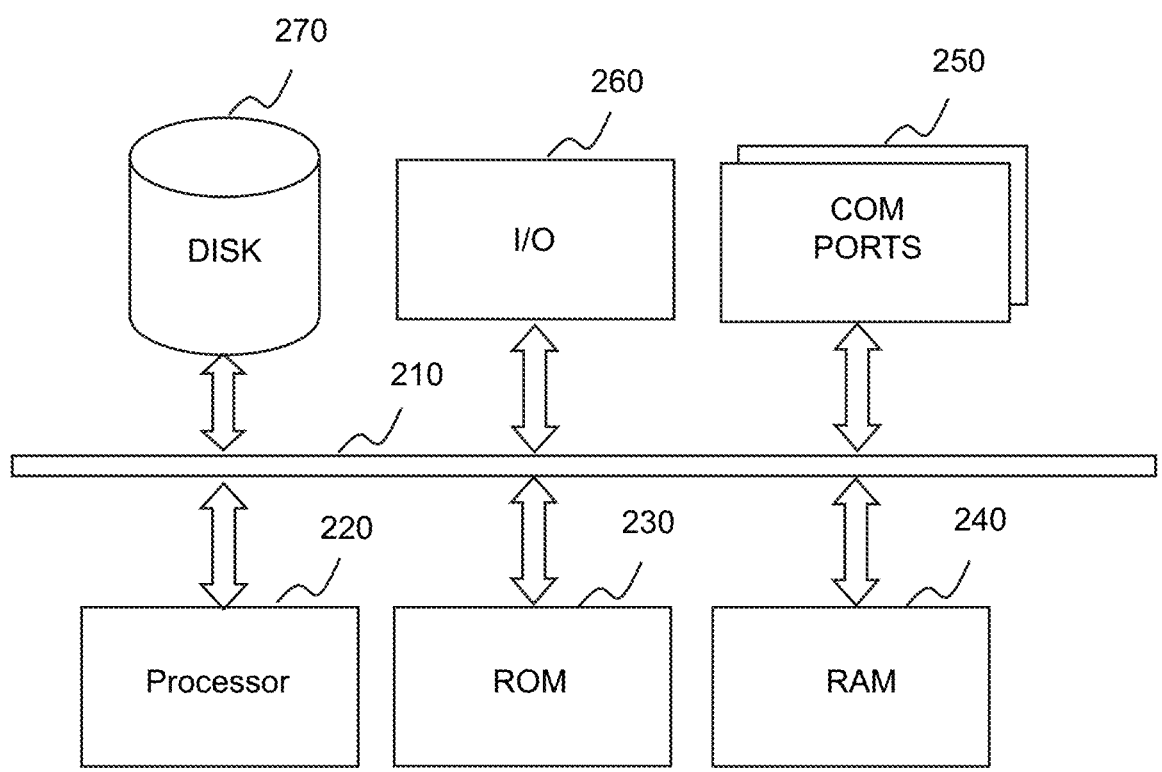
FIG. 2 is a schematic diagram illustrating exemplary hardware and/or software components of an exemplary computing device according to some embodiments of the present disclosure.

FIG. 2 is a schematic diagram illustrating exemplary hardware and/or software components of an exemplary computing device according to some embodiments of the present disclosure. In some embodiments, the server 110 may be implemented on the computing device 200. For example, the processing device 112 may be implemented on the computing device 200 and configured to perform functions of the processing device 112 disclosed in this disclosure.

The computing device 200 may be used to implement any component of the traffic monitoring system 100 as described herein. For example, the processing device 112 may be implemented on the computing device 200, via its hardware, software program, firmware, or a combination thereof. Although only one such computer is shown, for convenience, the computer functions relating to traffic monitoring as described herein may be implemented in a distributed fashion on a number of similar platforms to distribute the processing load.

The computing device 200, for example, may include COM ports 250 connected to and from a network connected thereto to facilitate data communications. In some embodiments, the computing device 200 may include a transmission device (not shown) via which the computing device 200 may transmit information and/or data to external components. In some embodiments, the transmission device may include a Network Interface Controller (NIC) configured to connect to an external network device to communicate with the network 120. In some embodiments, the transmission device may include a Radio Frequency (RF) module configured to communicate with the network 120 via a wireless connection.

The computing device 200 may also include a processor (e.g., a processor 220), in the form of one or more processors (e.g., logic circuits), for executing program instructions. For example, the processor 220 may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The computing device 200 may further include program storage and data storage of different forms including, for example, a disk 270, a read-only memory (ROM) 230, or a random-access memory (RAM) 240, for storing various data files to be processed and/or transmitted by the computing device 200. The computing device 200 may also include program instructions stored in the ROM 230, RAM 240, and/or another type of non-transitory storage medium to be executed by the processor 220. The methods and/or processes of the present disclosure may be implemented as the program instructions. The computing device 200 may also include an I/O component 260, supporting input/output between the computing device 200 and other components. The computing device 200 may also receive programming and data via network communications.

Merely for illustration, only one processor is illustrated in FIG. 2. Multiple processors 220 are also contemplated; thus, operations and/or method steps performed by one processor 220 as described in the present disclosure may also be jointly or separately performed by the multiple processors. For example, if in the present disclosure the processor 220 of the computing device 200 executes both step A and step B, it should be understood that step A and step B may also be performed by two different processors 220 jointly or separately in the computing device 200 (e.g., a first processor executes step A and a second processor executes step B, or the first and second processors jointly execute steps A and B).

Figure 3:
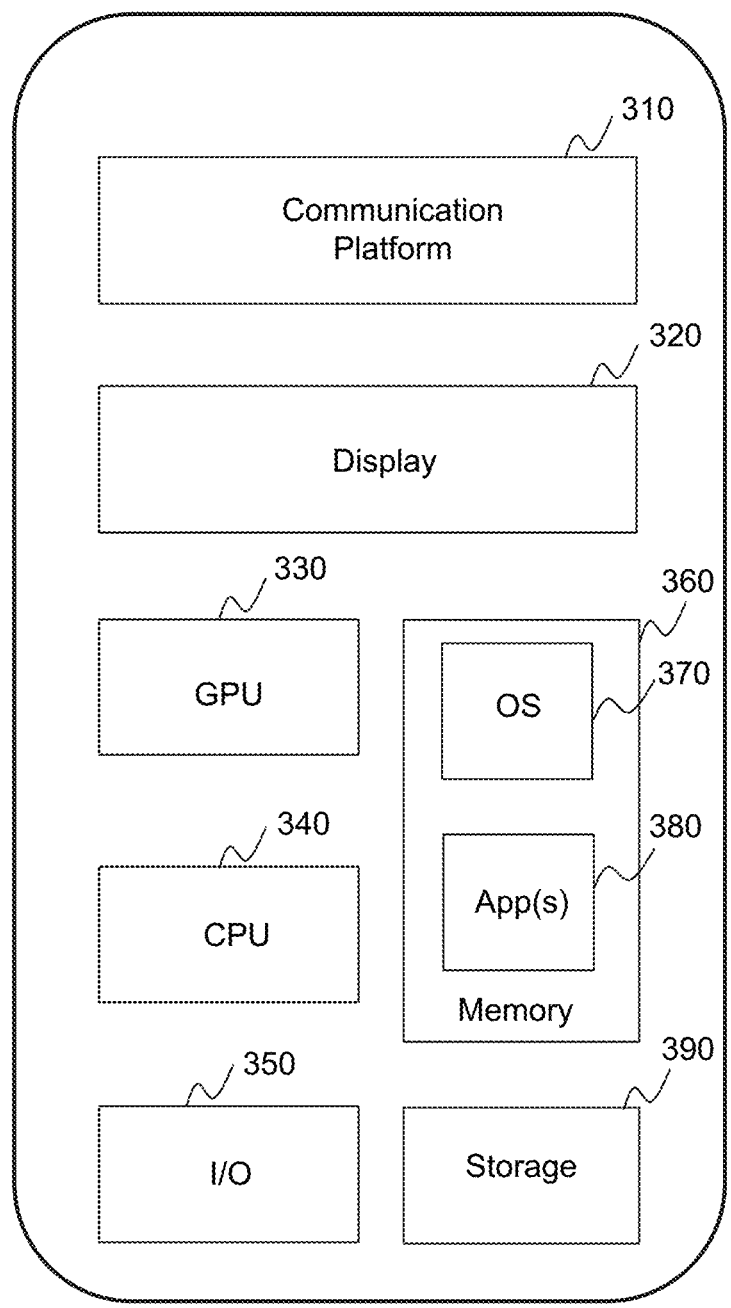
FIG. 3 is a schematic diagram illustrating exemplary hardware and/or software components of an exemplary terminal device according to some embodiments of the present disclosure.

FIG. 3 is a schematic diagram illustrating exemplary hardware and/or software components of an exemplary terminal device according to some embodiments of the present disclosure. In some embodiments, the user device 140 may be implemented on the terminal device 300 shown in FIG. 3.

As illustrated in FIG. 3, the terminal device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the terminal device 300.

In some embodiments, an operating system 370 (e.g., iOS™, Android™, Windows Phone™) and one or more applications (Apps) 380 may be loaded into the memory 360 from the storage 390 in order to be executed by the CPU 340. The applications 380 may include a browser or any other suitable mobile apps for receiving and rendering information relating to traffic monitoring or other information from the processing device 112. User interactions may be achieved via the I/O 350 and provided to the processing device 112 and/or other components of the traffic monitoring system 100 via the network 120.

Figure 4:
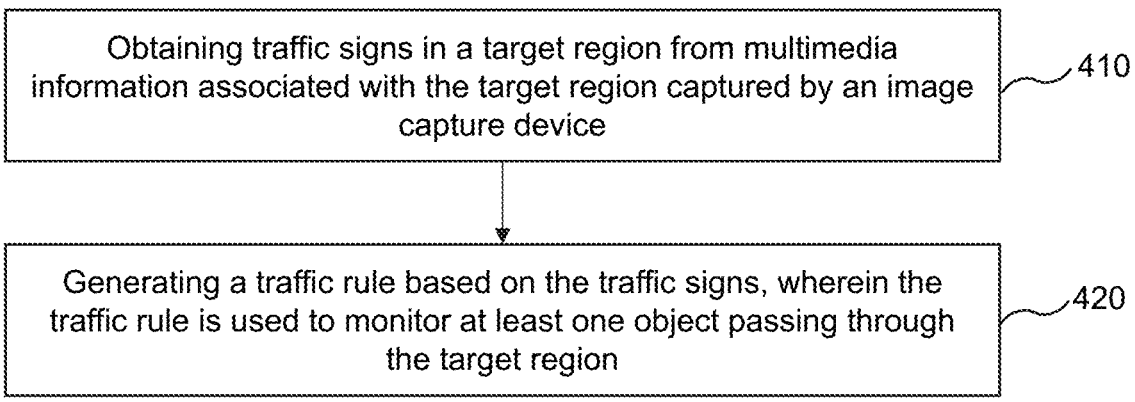
FIG. 4 is a flowchart illustrating an exemplary process for generating a traffic rule according to some embodiments of the present disclosure.

FIG. 4 is a flowchart illustrating an exemplary process for generating a traffic rule according to some embodiments of the present disclosure. In some embodiments, the process 400 may be implemented as a set of instructions (e.g., an application) stored in the storage ROM 230 or RAM 240. The processor 220 and/or the modules in FIG. 9 may execute the set of instructions, and when executing the instructions, the processor 220 and/or the modules may be configured to perform the process 400. The operations of the illustrated process presented below are intended to be illustrative. In some embodiments, the process 400 may be accomplished with one or more additional operations not described and/or without one or more of the operations herein discussed. Additionally, the order in which the operations of the process as illustrated in FIG. 4 and described below is not intended to be limiting.

In 410, traffic signs in a target region (also referred to as a "predetermined region") may be obtained from multimedia information associated with the target region captured by an image capture device (also referred to as a "capture device")

(e.g., the acquisition device 130). In some embodiments, the traffic signs in the target region may be obtained from the multimedia information by a traffic rule generation device 900 (e.g., an obtaining module 910 illustrated in FIG. 9). In some embodiments, the target region may be a region including a capture range of the image capture device.

In some embodiments, the multimedia information may include at least one image associated with the target region, at least one video associated with the target region, acoustic information, text information, or the like, or any combination thereof. In some embodiments, the multimedia information may be obtained from a storage device (e.g., the storage device 150). In some embodiments, the multimedia information may be captured in real-time by the image capture device.

In some embodiments, the traffic signs may include a lane line, an indicator sign, a color of a traffic light, a speed limit sign, or the like, or any combination thereof. More descriptions of the traffic signs may be found elsewhere in the present disclosure (e.g., FIGS. 5A-5L, FIGS. 6A-6P, and the descriptions thereof).

In 420, a traffic rule may be generated based on the traffic signs. In some embodiments, the traffic rule may be generated by the traffic rule generation device 900 (e.g., a generation module 920 illustrated in FIG. 9). As used herein, the traffic rule may refer to a rule or a regulation associated with a road (or a region) that an object (e.g., a vehicle, a pedestrian) on the road (or in the region) must follow. For example, the traffic rule may be "stop at a red light," "go at a green light (i.e., a prescribed moving time period)," "a speed limit associated with a specific region (e.g., an intersection)," "a speed limit associated with a specific road (e.g., a highway)," "a prescribed moving direction associated with a specific road (e.g., a one-way)," "a prescribed moving region associated with a specific region (e.g., an intersection)," "a moving rule (e.g., lane change allowed, no lane change) associated with a specific region," "a prescribed vehicle type associated with a specific lane (e.g., a motor vehicle lane, a non-motor vehicle lane)," "a prescribed parking region," etc. In some embodiments, the traffic rule may be used to monitor at least one object (e.g., a vehicle, a pedestrian) passing through the target region.

In some embodiments, according to process 400, a traffic rule can be automatically generated based on traffic signs in a target region and at least one object passing through the target region can be monitored based on the generated traffic rule, which can solve technical problems that the determination of the traffic rule requires manual intervention, which may result in a high cost and a complexity process. Accordingly, according to process 400, the traffic rule can be automatically generated based on the traffic signs without manual intervention, which can reduce the cost and simplify the process for generating the traffic rule, thereby improving the efficiency and accuracy of the traffic monitoring.

In some embodiments, after the traffic rule is generated based on the traffic signs, the at least one object may be monitored based on the generated traffic rule. Further, when it is detected that the at least one object has a violation behavior (also referred to as an "illegal behavior"), multimedia information corresponding to the violation behavior may be transmitted to a backstage (also referred to as a "target device") (e.g., a traffic management department, a data center, an alarm center, a terminal device associated with the object). According to the embodiments of the present disclosure, when it is detected that the at least one object has the violation behavior based on the generated traffic rule, a video associated with the violation behavior may be recorded and the recorded video may be transmitted to the backstage for subsequent processing by a relevant personnel. For example, the relevant personnel may confirm the violation behavior based on the recorded video and transmit information associated with the violation behavior to the at least one object (e.g., a terminal device of the at least one object). In some embodiments, the multimedia information (e.g., the video) obtained by monitoring the at least one object may be stored according to a predetermined time interval. The predetermined time interval may be a default setting of the traffic monitoring system 100 or may be adjustable under different situations.

In some embodiments, status information of the at least one object in the target region may be obtained. When the at least one object is a vehicle, the status information may include a location of the vehicle in the target region, a driving velocity of the vehicle, a driving direction of the vehicle, a driving path of the vehicle, a type (e.g., a motor vehicle, a non-motor vehicle) of the vehicle, or the like, or any combination thereof. When the at least one object is a pedestrian, the status information may include a location of the pedestrian in the target region, a moving path of the pedestrian in the target region, a moving direction of the pedestrian in the target region, or the like, or any combination thereof. The "velocity" used in the present disclosure includes direction and magnitude (which can be referred to as "speed"). Further, the at least one object may be monitored based on the traffic rule and the status information. For example, whether the vehicle is speeding may be monitored by comparing the speed limit in the traffic rule of the target region and the driving velocity of the vehicle. As another example, whether the vehicle is going through a red light may be monitored based on the color of the traffic light and the location of the vehicle. According to the embodiments of the present disclosure, a vehicle or a pedestrian in the target region may be simultaneously monitored and whether the vehicle or the pedestrian has a violation behavior may be determined.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 5A:
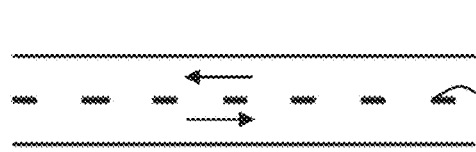
FIGS. 5A-5L are schematic diagrams illustrating exemplary lane lines according to some embodiments of the present disclosure.
Figure 5B:
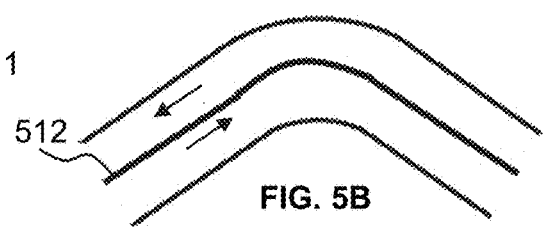
Figure 5C:
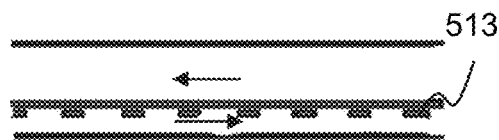
Figure 5D:
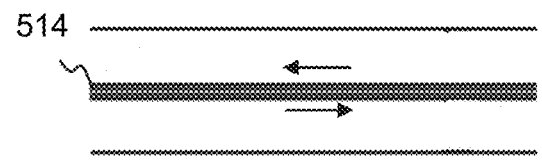
Figure 5E:
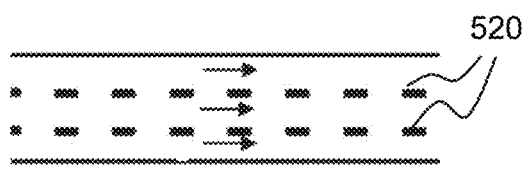
Figure 5F:
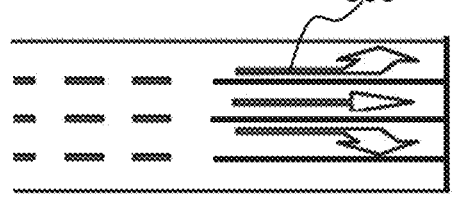
Figure 5G:
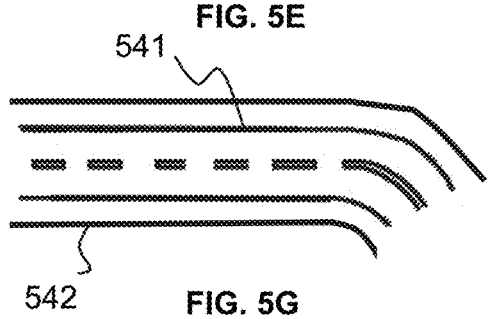
Figure 5H:
Figure 5I:

FIGS. 5A-5L are schematic diagrams illustrating exemplary lane lines according to some embodiments of the present disclosure. As illustrated, the lane line may include a lane central line (e.g., 511 illustrated in FIG. 5A, 512 illustrated in FIG. 5B, 513 illustrated in FIG. 5C, 514 illustrated in FIG. 5D), a lane dividing line (e.g., 520 illustrated in FIG. 5E), a guide lane line (e.g., 530 illustrated in FIG. 5F), a lane edge line (e.g., 541 and 542 illustrated in FIG. 5G), a stop line (e.g., 550 illustrated in FIG. 5H), a give way line (e.g., 561 illustrated in FIG. 5I, 562 illustrated FIG. 5J), a crosswalk line (e.g., 570 illustrated in FIG. 5K), a diversion line (e.g., 580 illustrated in FIG. 5L), etc.

The lane central line may refer to a line (e.g., a dotted line, a solid line, or a combination thereof) used to separate traffic flows along opposite directions. As illustrated in FIG. 5A, the lane central line may be a single dotted line 511 indicating that a vehicle is allowed to overtake or turn left across the lane central line. As illustrated in FIG. 5B, the lane central line may be a single solid line 512 indicating that a vehicle is not allowed to overtake or turn left across the lane central line. As illustrated in FIG. 5C, the lane central line may be a combination 513 of a dotted line and a solid line indicating that a vehicle in a side of the dotted line is allowed to overtake or turn left across the lane central line and a vehicle in a side of the solid line is not allowed to overtake or turn left across the lane central line. As illustrated in FIG. 5D, the lane central line may be a double solid line 514 indicating that a vehicle is prohibited from overtaking or turning left across the lane central line.

The lane dividing line may refer to a line used to separate traffic flows along a same direction. As illustrated in FIG. 5E, the lane dividing line may be a dotted line 520 indicating that the vehicle is allowed to overtake or change a lane across the lane dividing line.

The guide lane line may refer to a line used to guide a moving direction of a vehicle. As illustrated in FIG. 5F, the guide lane line may be a solid line 530 indicating that a vehicle should move along a direction indicated by the guide lane line (e.g., an arrow in the guide lane line).

The lane edge line may refer to a line used to indicate an edge of a lane. As illustrated in FIG. 5G, the lane edge line may be a solid line 541 indicating an edge of a motor vehicle lane (i.e., a line dividing a motor vehicle lane and a non-motor vehicle lane) or a solid line 542 indicating an edge of a non-motor vehicle lane.

The stop line may refer to a line used to indicate a stop position where a vehicle waits for a release signal of a traffic light (e.g., a traffic light 551). As illustrated in FIG. 5H, the stop line may be a solid line 550 indicating that a vehicle should stop behind the stop line when waiting for the release signal.

Figure 5J:
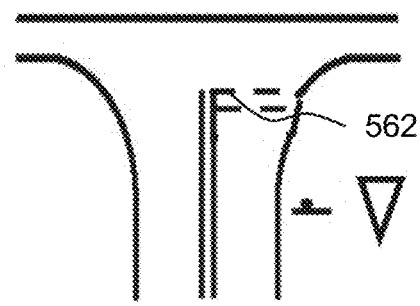

The give way line may refer to a line used to indicate a position where a vehicle should stop or slow down to give way. As illustrated in FIG. 5I, the give way line may be a double solid line 561 indicating that the vehicle should stop and give way. As illustrated in FIG. 5J, the give way line may be a double dotted line 562 indicating that a vehicle should slow down and give way.

Figure 5K:
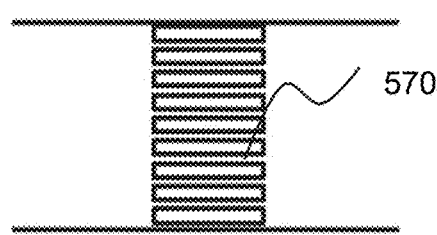

The crosswalk line (also referred to as a "zebra stripe") may refer to a line region used to indicate that pedestrians are allowed to cross a road through the line region. As illustrated in FIG. 5K, the crosswalk line may be a region 570 including a plurality of rectangular blocks (or solid lines).

Figure 5L:
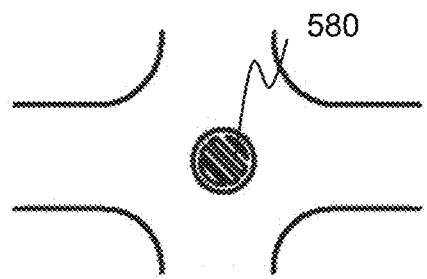

The diversion line may refer to a line region (e.g., a v-shaped region, a twill region, a circular region) used to indicate that a vehicle must move according to a prescribed route and must not press or cross the diversion line. As illustrated in FIG. 5L, the diversion line may be a circular line region 580. A shape of the diversion line may be associated with a terrain condition of a road.

Figure 6A:
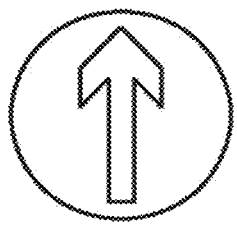
FIGS. 6A-6P are schematic diagrams illustrating exemplary indicator signs according to some embodiments of the present disclosure.
Figure 6B:
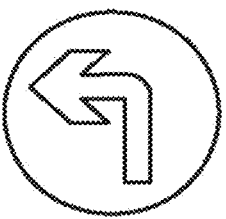
Figure 6C:
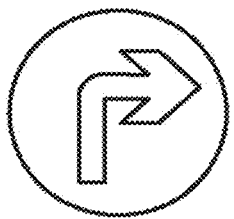
Figure 6D:
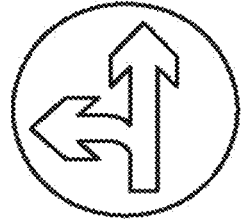
Figure 6E:
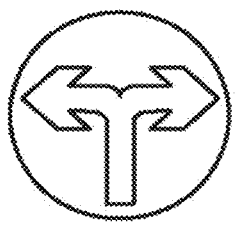
Figure 6F:
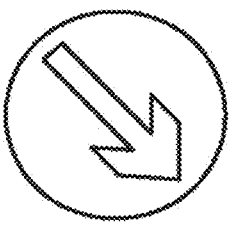
Figure 6G:
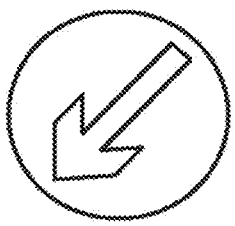
Figure 6H:
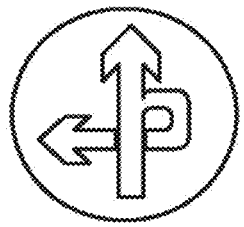
Figure 6I:
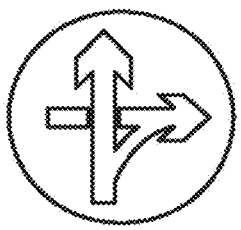
Figure 6J:
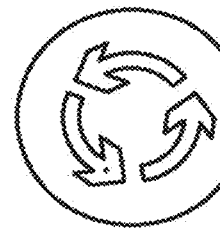
Figure 6K:
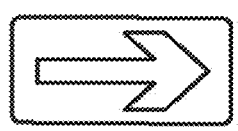
Figure 6L:
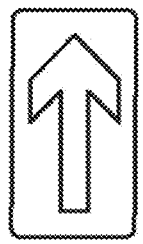
Figure 6M:
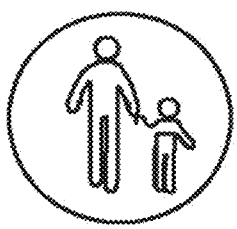
Figure 6N:
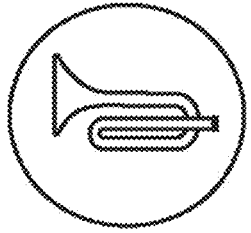
Figure 6O:
Figure 6P:
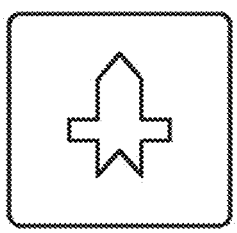

FIGS. 6A-6P are schematic diagrams illustrating exemplary indicator signs according to some embodiments of the present disclosure. As illustrated, the indicator signs may include a straight arrow pointing to the front illustrated in FIG. 6A indicating "ahead only," a curved arrow pointing to the left illustrated in FIG. 6B indicating "turn left ahead," a curved arrow pointing to the right illustrated in FIG. 6C indicating "turn right ahead," a combination of a straight arrow pointing to the front and a curved arrow pointing to the left illustrated in FIG. 6D indicating "ahead or turn left," a combination of a curved arrow pointing to the left and a curved arrow pointing to the right illustrated in FIG. 6E indicating "right or left only," a straight arrow pointing to the bottom right illustrated in FIG. 6F indicating "keep right," a straight arrow pointing to the bottom left illustrated in FIG. 6G indicating "keep left," a combination of a straight arrow pointing to the front and a cross curved arrow pointing to the left illustrated in FIG. 6H indicating "stereo cross ahead or turn left ahead," a combination of a straight arrow pointing to the front, a straight arrow pointing to the right, and a curved arrow pointing to the right illustrated in FIG. 6I indicating "stereo cross ahead or turn right ahead," a combination of three curved arrows illustrated in FIG. 6J indicating "roundabout," a straight arrow pointing to the right illustrated in FIG. 6K indicating "one way traffic (right)," a straight arrow pointing to the front illustrated in FIG. 6L indicating "one way traffic (ahead)," a simplified drawing of two people illustrated in FIG. 6M indicating "walking area," a simplified drawing of a horn illustrated in FIG. 6N indicating "sound honk," a number illustrated in FIG. 6O indicating "speed limit (e.g., speed limit "50 km/h")," an arrow including two wings illustrated in FIG. 6P indicating "priority at Intersection," etc.

Figure 7:
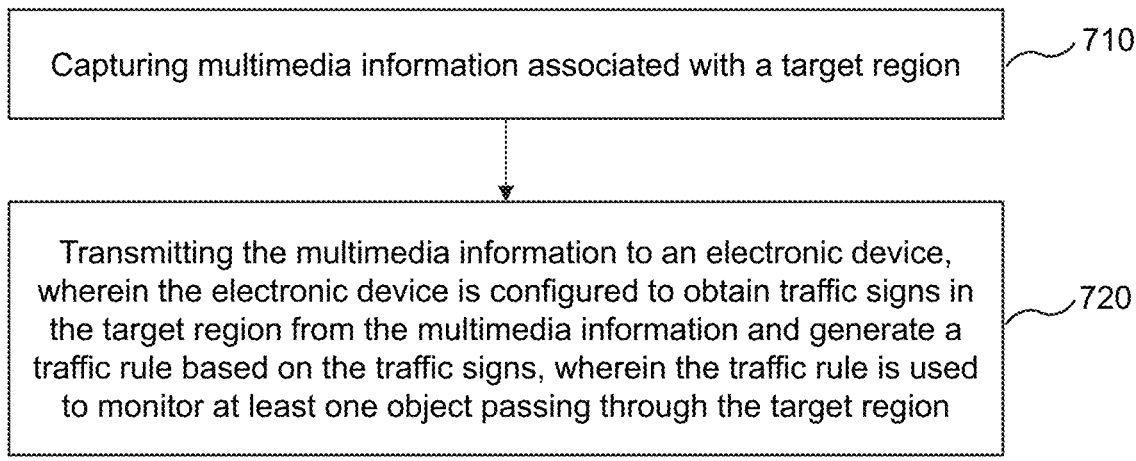
FIG. 7 is a flowchart illustrating an exemplary process for generating a traffic rule according to some embodiments of the present disclosure.

FIG. 7 is a flowchart illustrating an exemplary process for generating a traffic rule according to some embodiments of the present disclosure. In some embodiments, the process 700 may be implemented as a set of instructions (e.g., an application) stored in the storage ROM 230 or RAM 240. The processor 220 and/or the modules in FIG. 10 may execute the set of instructions, and when executing the instructions, the processor 220 and/or the modules may be configured to perform the process 700. The operations of the illustrated process presented below are intended to be illustrative. In some embodiments, the process 700 may be accomplished with one or more additional operations not described and/or without one or more of the operations herein discussed. Additionally, the order in which the operations of the process as illustrated in FIG. 7 and described below is not intended to be limiting.

In 710, multimedia information associated with a target region may be captured. In some embodiments, the multimedia information may be captured by a traffic rule generation device 1000 (e.g., an acquisition module 1010 illustrated in FIG. 10).

In 720, the multimedia information may be transmitted to an electronic device via a network (e.g., the network 120). In some embodiments, the multimedia information may be transmitted to the electronic device by the traffic rule generation device 1000 (e.g., a transmission module 1020 illustrated in FIG. 10). Further, the electronic device may obtain traffic signs in the target region from the multimedia information and generate a traffic rule based on the traffic signs. In some embodiments, the traffic rule may be used to monitor at least one object passing through the target region. In some embodiments, the electronic device may be a separate component of the traffic monitoring system 100 or may be integrated into one or more components (e.g., the processing device 112, the user device 140) of the traffic monitoring system 100.

According to process 700, a traffic rule can be automatically generated based on traffic signs in a target region and at least one object passing through the target region can be monitored based on the generated traffic rule, which can solve technical problems that the determination of the traffic rule requires manual intervention, which may result in a high cost and a complexity process. Accordingly, according to process 700, the traffic rule can be automatically generated based on the traffic signs without manual intervention, which can reduce the cost and simplify the process for generating the traffic rule, thereby improving the efficiency and accuracy of the traffic monitoring.

In some embodiments, for different traffic scenes, different traffic rules may be generated based on traffic signs in the traffic scenes.

Scene 1

At an intersection, an image capture device (e.g., a camera) is set back to the intersection and can capture multimedia information (e.g., images, videos) associated with a target region (e.g., a region including the intersection). Traffic signs (e.g., lane lines (e.g., a dotted line, a solid line, a double line), indicator signs (e.g., moving direction signs)) in the target region may be extracted from the multimedia information. According to the traffic signs, a traffic rule (e.g., a prescribed moving region associated with the intersection, a prescribed moving direction associated with the intersection, a prescribed vehicle type associated with the intersection, a prescribed parking region, a speed limit) may be automatically generated. For example, according to lane central lines, lane edge lines, and lane dividing lines on a road where the intersection is located, the prescribed moving region associated with the intersection may be determined. As another example, according to types (e.g., a solid line or a dotted line) of lane lines on the road, whether a vehicle is allowed to change lane across the lane lines may be determined. As a further example, according to the moving direction signs at the intersection, the prescribed moving direction associated with the intersection may be determined.

When at least one object (e.g., a vehicle, a pedestrian) passes through the intersection, status information (e.g., location information, velocity information, a moving direction, a moving path) of the at least one object may be extracted from the multimedia information. According to the status information and the traffic rule, a traffic behavior of the at least one object may be monitored. For example, according to the prescribed moving region and the moving path of the vehicle at the intersection, whether the vehicle has an illegal lane change may be determined. As another example, according to the prescribed moving direction and the moving direction of the vehicle, whether the vehicle is conversely driving may be determined. As a further example, according to the prescribed moving region and the location information of the pedestrian, whether the pedestrian is on a motor vehicle lane may be determined. As a still further example, according to the prescribed parking region and the location information of the vehicle, whether the vehicle has an illegal parking may be determined.

Scene 2

The image capture device (e.g., the camera) is set at a position facing a traffic light and has a certain distance from the traffic light. Traffic signs (e.g., a color of the traffic light) in the target region may be extracted from the multimedia information captured by the camera. According to the color of the traffic light, a traffic rule (e.g., a prescribed moving time period, a prescribed moving region within the prescribed moving time period) may be automatically generated. When the at least one object passes through the target region, status information (e.g., location information, a moving path) of the at least one object may be extracted from the multimedia information. According to the status information and the traffic rule, a traffic behavior of the at least one object may be monitored. For example, according to the prescribed moving region within the prescribed moving time period and the location information of the at least one object within the prescribed moving time period, whether the at least one object runs a red traffic light may be determined.

Scene 3

According to a type of the vehicle and a location (or a distance) of the vehicle in the multimedia information (e.g., the video) associated with the target region, sizes of the vehicle in different locations (e.g., different frames of the video) of the multimedia information may be determined. Further, a velocity of the vehicle may be determined. According to the velocity of the vehicle and the speed limit in the traffic rule generated based on traffic signs (e.g., a speed limit sign) extracted from the multimedia information, whether the vehicle is speeding or driving at a low speed may be determined. Further, according to velocity information of a plurality of vehicles in the target region, whether a congestion occurs in the target region may be determined.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 8:
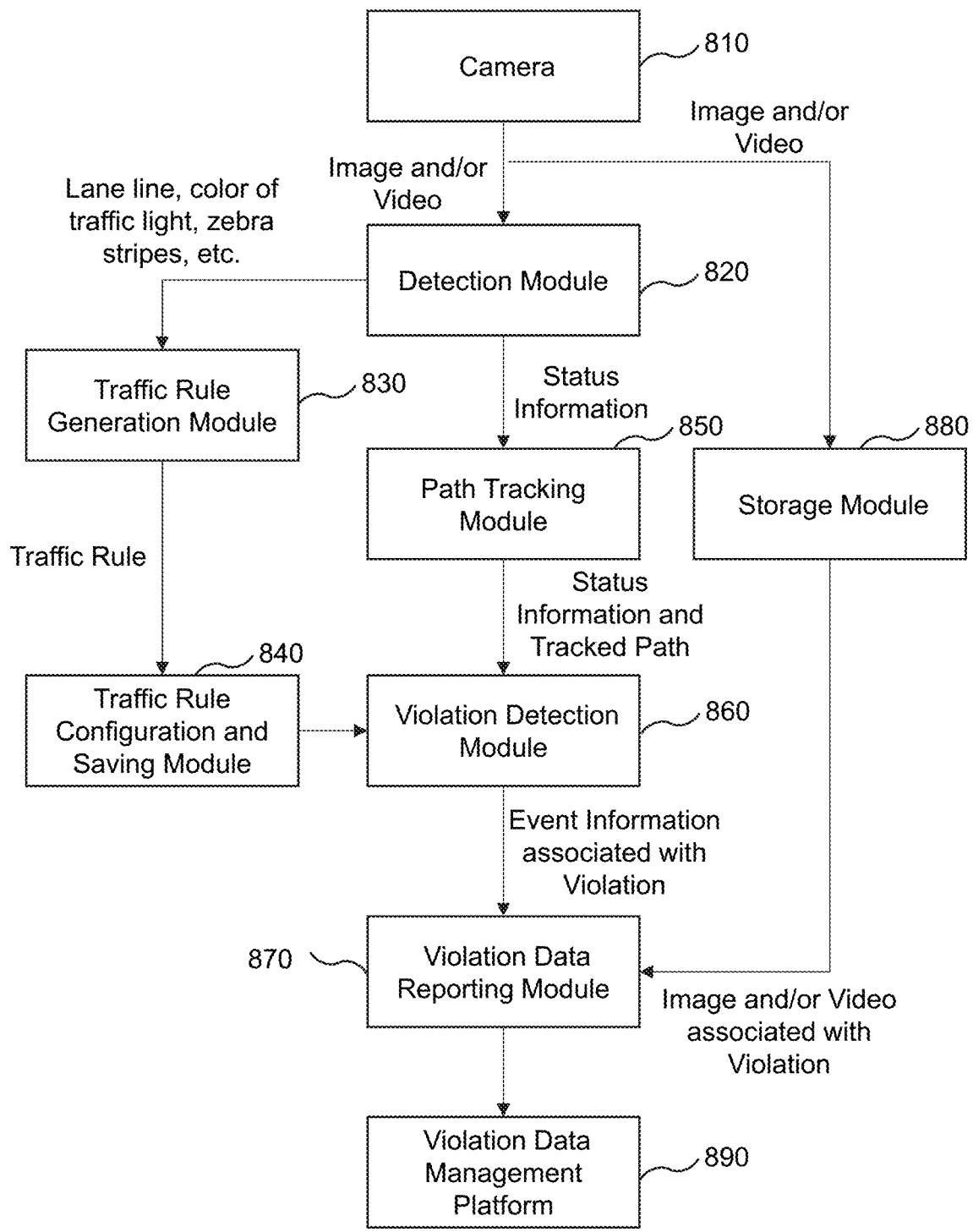
FIG. 8 is a schematic diagram illustrating an exemplary process for generating a traffic rule and/or monitoring at least one object based on the traffic rule according to some embodiments of the present disclosure.

FIG. 8 is a schematic diagram illustrating an exemplary process for generating a traffic rule and/or monitoring at least one object based on the traffic rule according to some embodiments of the present disclosure.

Step 1: The image capture device (e.g., a camera 810) may capture multimedia information (e.g., an image, a video) associated with a target region and transmit the multimedia information to a detection module 820.

Step 2: The detection module 820 may extract traffic signs (e.g., a lane line, a color of a traffic light, zebra stripes, a roadblock) associated with the target region from the received multimedia information and transmit the traffic signs to a traffic rule generation module 830. The detection module 820 may also identify at least one object (e.g., a vehicle, a pedestrian) in the received multimedia information, extract status information (e.g., a type of the vehicle, location information of the vehicle, a moving path of the vehicle, a moving direction of the vehicle, location information of the pedestrian, a moving path of the pedestrian, a moving direction of the pedestrian) associated with the at least one object from the received multimedia information, and transmit the status information to a path tracking module 850. The detection module 820 may also determine a relationship between pixel distance information in the multimedia information and actual distance information based on the type of the vehicle and transmit the relationship to the traffic rule generation module 830.

Step 3: The traffic rule generation module 830 may generate a traffic rule (which may be used to monitor a traffic behavior of an object) based on the received traffic signs. For example, the traffic rule generation module 830 may determine information including a prescribed moving direction for vehicles, whether vehicles are allowed to turn around, cross a lane line, or park, a speed limit of vehicles, etc. Further, the traffic rule generation module 830 may determine the traffic rule based on the above information. In some embodiments, the traffic rule may include but not limited to "driving on a lane line," "illegal lane change," "illegal parking," "over speed," "low speed," "running a red light," "a vehicle is driving on a lane which does not match the type of the vehicle," "a pedestrian is moving on a lane," "converse driving," "congestion," etc. Further, the traffic rule generation module 830 may transmit the traffic rule to a traffic rule configuration and saving module 840.

Step 4: The traffic rule configuration and saving module 840 may generate a configuration of the traffic rule and save the configuration. Further, the traffic rule configuration and saving module 840 may transmit the configuration to a violation detection module 860.

Step 5: The path tracking module 850 may track the moving path of the at least one object (e.g., a vehicle, a pedestrian). For example, the path tracking module 850 may track the moving path of the at least one object by merging a plurality of video frames corresponding to the target region. Further, the path tracking module 850 may transmit the status information and the tracked moving path of the at least one object to the violation detection module 860.

Step 6: The violation detection module 860 may monitor the traffic behavior of the at least one object based on the traffic rule and the status information and/or the tracked moving path of the at least one object. Further, the violation detection module 860 may determine event information (e.g., at least one image corresponding to the at least one object, the status information of the at least one object, location information associated with the target region, a traffic violation type) associated with the traffic behavior of the at least one object and transmit the event information to a violation data reporting module 870.

Step 7: A storage module 880 may store the multimedia information (e.g., the image, the video) received from the image capture device according to a predetermined time interval, which can ensure that multimedia information associated with the violation traffic behavior is complete and then the multimedia information can be divided and reported according to time. Further, the storage module 880 may transmit the multimedia information associated with the violation traffic behavior to a violation data reporting module 870.

Step 8: The violation data reporting module 870 may manage the event information received from the violation detection module 860 and the multimedia information associated with the violation traffic behavior received from the storage module 880. Further, the violation data reporting module 870 may report the event information and the multimedia information to a violation data management platform 890.

According to the above operations, traffic signs may be automatically identified from multimedia information associated with a traffic scene and a traffic rule may be automatically generated based on the traffic signs. Further, a traffic behavior of at least one object may be monitored based on the traffic rule.

Figure 9:
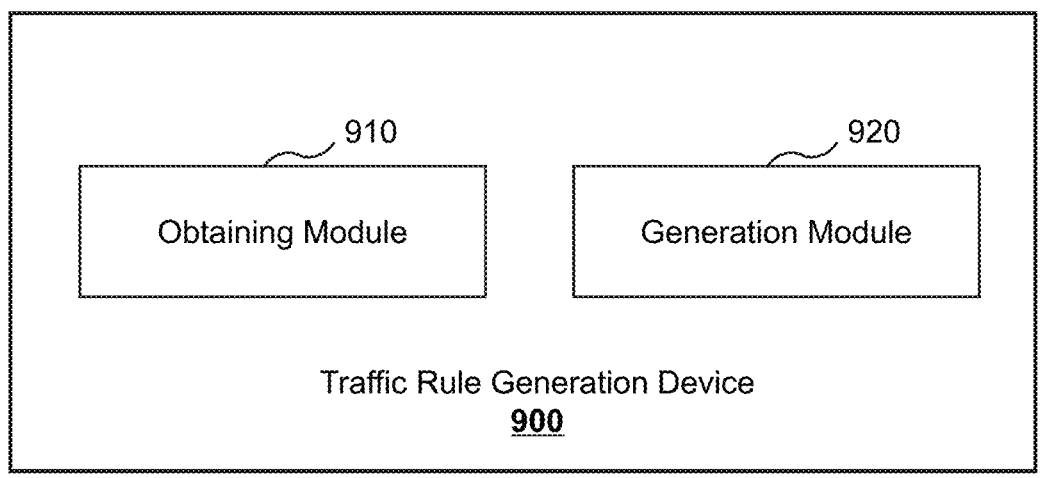
FIG. 9 is a block diagram illustrating an exemplary traffic rule generation device according to some embodiments of the present disclosure.

FIG. 9 is a block diagram illustrating an exemplary traffic rule generation device according to some embodiments of the present disclosure. The traffic rule generation device 900 may include an obtaining module 910 and a generation module 920. In some embodiments, one or more components of the traffic rule generation device 900 may be integrated into the processing device 112.

The obtaining module 910 may be configured to obtain traffic signs in a target region from multimedia information associated with the target region captured by an image capture device (e.g., the acquisition device 130). In some embodiments, the traffic signs may include a lane line, an indicator sign, a color of a traffic light, a speed limit sign, or the like, or any combination thereof.

The generation module 920 may be configured to generate a traffic rule based on the traffic signs. In some embodiments, the traffic rule may be used to monitor at least one object (e.g., a vehicle, a pedestrian) passing through the target region.

According to the above technical solution, a traffic rule can be automatically generated based on traffic signs in a target region and at least one object passing through the target region can be monitored based on the generated traffic rule, which can solve technical problems that the determination of the traffic rule requires manual intervention, which may result in a high cost and a complexity process. Accordingly, according to the above technical solution, the traffic rule can be automatically generated based on the traffic signs without manual intervention, which can reduce the cost and simplify the process for generating the traffic rule, thereby improving the efficiency and accuracy of the traffic monitoring.

In some embodiments, the generation module 920 may monitor the at least one object based on the generated traffic rule. Further, when it is detected that the at least one object has a violation behavior, the generation module 920 may transmit multimedia information corresponding to the violation behavior to a backstage (e.g., a traffic management department, a data center, an alarm center, a terminal device associated with the object). According to the embodiments of the present disclosure, when it is detected that the at least one object has the violation behavior based on the generated traffic rule, a video associated with the violation behavior may be recorded and the recorded video may be transmitted to the backstage for subsequent processing by a relevant personnel. In some embodiments, the multimedia information (e.g., the video) obtained by monitoring the at least one object may be stored according to a predetermined time interval.

In some embodiments, the obtaining module 920 may obtain status information of the at least one object in the target region. When the at least one object is a vehicle, the status information may include a location of the vehicle in the target region, a driving velocity of the vehicle, a driving direction of the vehicle, a driving path of the vehicle, a type (e.g., a motor vehicle, a non-motor vehicle) of the vehicle, or the like, or any combination thereof. When the at least one object is a pedestrian, the status information may include a location of the pedestrian in the target region, a moving path of the pedestrian in the target region, a moving direction of the pedestrian in the target region, or the like, or any combination thereof. Further, the at least one object may be monitored based on the traffic rule and the status information. According to the embodiments of the present disclosure, a vehicle or a pedestrian in the target region may be simultaneously monitored and whether the vehicle or the pedestrian has a violation behavior may be determined.

The modules in the traffic rule generation device 900 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined as a single module, and any one of the modules may be divided into two or more units.

Figure 10:
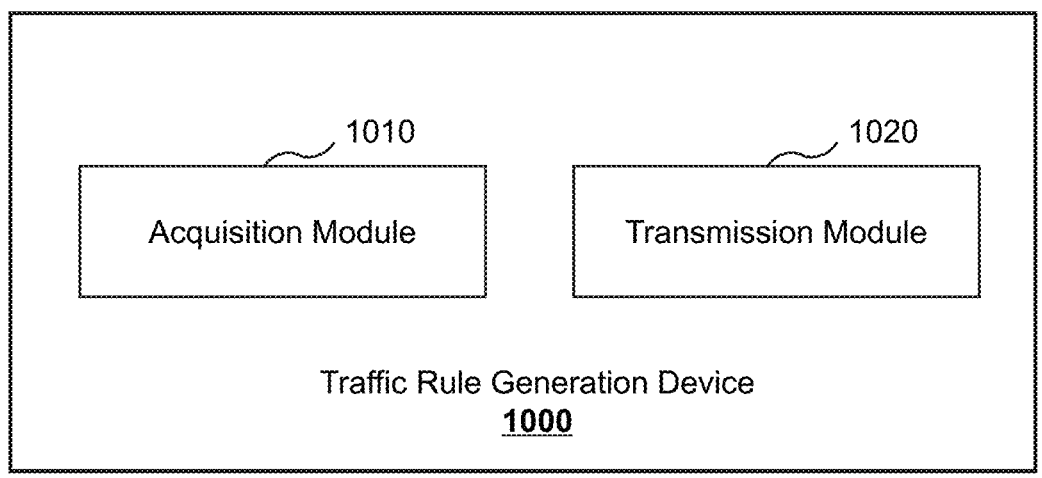
FIG. 10 is a block diagram illustrating an exemplary traffic rule generation device according to some embodiments of the present disclosure.

FIG. 10 is a block diagram illustrating an exemplary traffic rule generation device according to some embodiments of the present disclosure. The traffic rule generation device 1000 may include an acquisition module 1010 and a transmission module 1020. In some embodiments, one or more components of the traffic rule generation device 1000 may be integrated into the processing device 112.

The acquisition module 1010 may be configured to capture multimedia information associated with a target region.

The transmission module 1020 may be configured to transmit the multimedia information to an electronic device. Further, the electronic device may obtain traffic signs in the target region from the multimedia information and generate a traffic rule based on the traffic signs. In some embodiments, the traffic rule may be used to monitor at least one object passing through the target region.

According to the above technical solution, a traffic rule can be automatically generated based on traffic signs in a target region and at least one object passing through the target region can be monitored based on the generated traffic rule, which can solve technical problems that the determination of the traffic rule requires manual intervention, which may result in a high cost and a complexity process. Accordingly, according to the above technical solution, the traffic rule can be automatically generated based on the traffic signs without manual intervention, which can reduce the cost and simplify the process for generating the traffic rule, thereby improving the efficiency and accuracy of the traffic monitoring.

The modules in the traffic rule generation device 1000 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined as a single module, and any one of the modules may be divided into two or more units.

Figure 11:
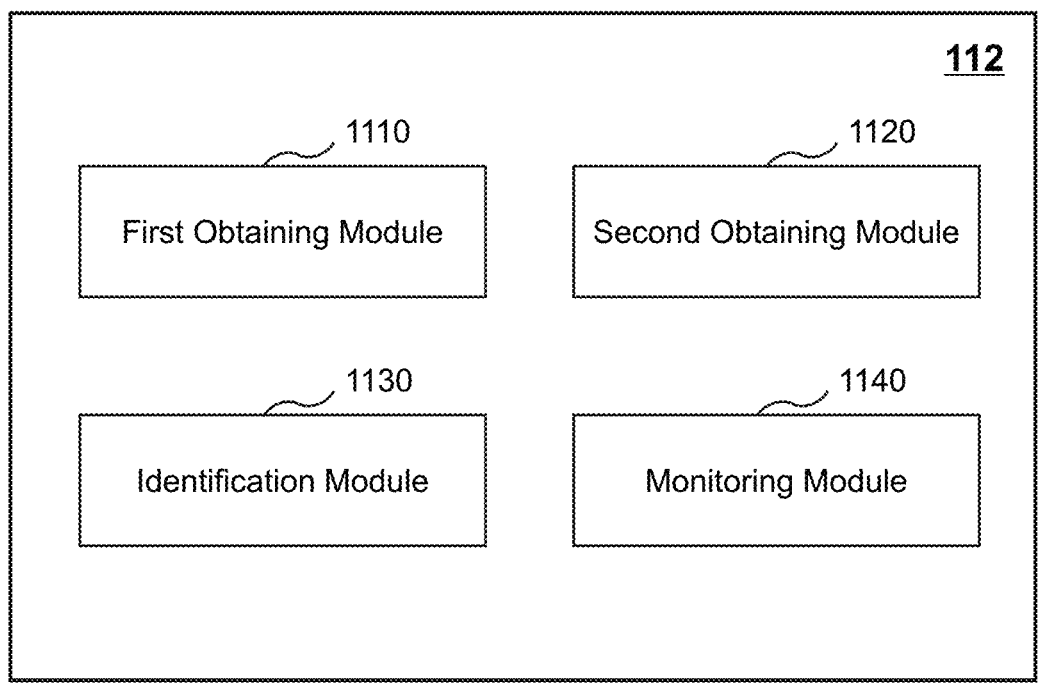
FIG. 11 is a block diagram illustrating an exemplary processing device according to some embodiments of the present disclosure.

FIG. 11 is a block diagram illustrating an exemplary processing device according to some embodiments of the present disclosure. The processing device 112 may include a first obtaining module 1110, a second obtaining module 1120, an identification module 1130, and a monitoring module 1140.

The first obtaining module 1110 may be configured to obtain at least one image (e.g., a static image, a video frame) associated with a predetermined region captured by a capture device (e.g., the acquisition device 130).

The second obtaining module 1120 may be configured to obtain a predetermined traffic rule associated with the predetermined region. In some embodiments, the predetermined traffic rule may be determined based on one or more predetermined images associated with the predetermined region.

The identification module 1130 may be configured to identify at least one object in the at least one image. As described in connection with FIG. 4, the at least one object may include a vehicle or a pedestrian.

The monitoring module 1140 may be configured to monitor a traffic behavior of the at least one object based on the predetermined traffic rule. In some embodiments, the monitoring module 1140 may determine status information associated with the at least object based on the at least one image. The status information associated with the at least object may include a type of the at least one object, location information of the at least one object, velocity information of the at least one object, a moving path of the at least one object, a moving direction of the at least one object, or the like, or any combination thereof. Further, the monitoring module 1140 may monitor the traffic behavior of the at least one object based on the status information according to the predetermined traffic rule.

The modules in the processing device 112 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined as a single module, and any one of the modules may be divided into two or more units.

For example, the first obtaining module 1110 and the second obtaining module 1120 may be combined as a single module which may both obtain the at least one image associated with the predetermined region and the predetermined traffic rule associated with the predetermined region. As another example, the processing device 112 may also include a transmission module configured to transmit signals (e.g., electrical signals, electromagnetic signals) to one or more components (e.g., the user device 140) of the traffic monitoring system 100. As a further example, the processing device 112 may include a storage module (not shown) used to store information and/or data (e.g., the predetermined region, the at least one image associated with the predetermined region) associated with the traffic monitoring.

Figure 12:
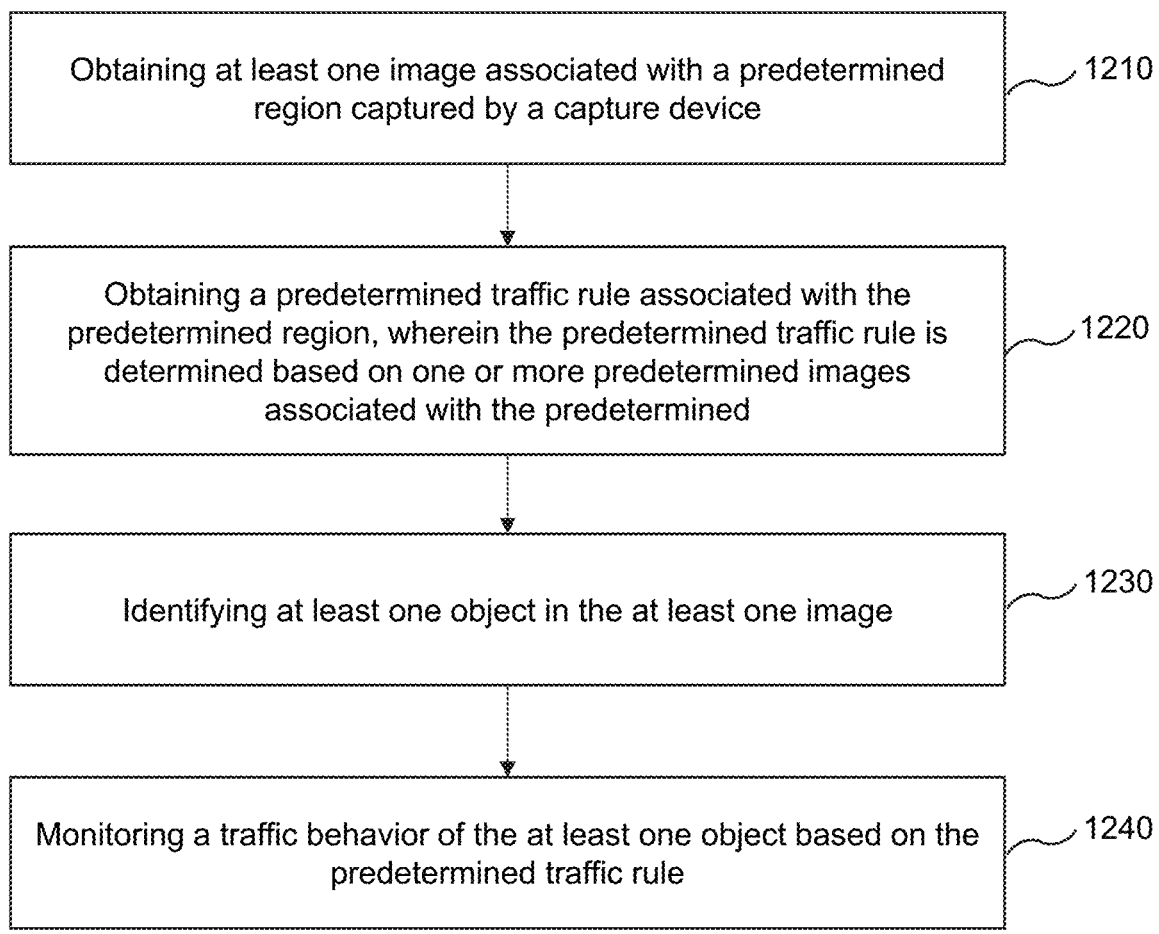
FIG. 12 is a flowchart illustrating an exemplary process for object monitoring according to some embodiments of the present disclosure.

FIG. 12 is a flowchart illustrating an exemplary process for object monitoring according to some embodiments of the present disclosure. In some embodiments, the process 1200 may be implemented as a set of instructions (e.g., an application) stored in the storage ROM 230 or RAM 240. The processor 220 and/or the modules in FIG. 11 may execute the set of instructions, and when executing the instructions, the processor 220 and/or the modules may be configured to perform the process 1200. The operations of the illustrated process presented below are intended to be illustrative. In some embodiments, the process 1200 may be accomplished with one or more additional operations not described and/or without one or more of the operations herein discussed. Additionally, the order in which the operations of the process as illustrated in FIG. 12 and described below is not intended to be limiting.

In 1210, the processing device 112 (e.g., the first obtaining module 1110) (e.g., the interface circuits of the processor 220) may obtain at least one image (e.g., a static image, a video frame) associated with a predetermined region captured by a capture device (e.g., the acquisition device 130). In some embodiments, the predetermined region may be a region including a capture range of the capture device.

In some embodiments, the capture device may be mounted in the predetermined region (e.g., an intersection) and configured to capture the at least one image from the predetermined region. In some embodiments, the processing device 112 may directly obtain the at least one image from the capture device. In some embodiments, after capturing the at least one image, the capture device may transmit the at least one captured image to a storage device (e.g., the storage device 150) to store according to a predetermined time interval. Accordingly, the processing device 112 may obtain the at least one image from the storage device.

In 1220, the processing device 112 (e.g., the second obtaining module 1120) (e.g., the interface circuits or the processing circuits of the processor 220) may obtain a predetermined traffic rule associated with the predetermined region. As described in connection with FIG. 4, the predetermined traffic rule may refer to a rule or a regulation associated with a road (or a region) that an object (e.g., a vehicle, a pedestrian) on the road (or in the region) must follow.

In some embodiments, the predetermined traffic rule may be determined based on one or more predetermined images associated with the predetermined region. For example, as described elsewhere in the present disclosure, the processing device 112 or a traffic rule generation device 1300 illustrated in FIG. 13 may extract one or more traffic signs in the one or more predetermined images and determine the predetermined traffic rule associated with the predetermined region based on the one or more traffic signs. In some embodiments, the one or more predetermined images may be pre-stored in the storage device 150 and the predetermined traffic rule may be generated offline based on the one or more predetermined images and stored in the storage device 150. Accordingly, the processing device 112 may directly obtain the predetermined traffic rule from the storage device 150. In some embodiments, the one or more predetermined images may be captured in real time (which can be considered that the one or more predetermined images are the same as the at least one image associated with the predetermined region) and the processing device 112 may generate the predetermined traffic rule in real time. More descriptions regarding determining the predetermined traffic rule may be found elsewhere in the present disclosure (e.g., FIG. 13, FIG. 14, and the descriptions thereof).

In 1230, the processing device 112 (e.g., the identification module 1130) (e.g., the processing circuits of the processor 220) may identify at least one object in the at least one image.

As described in connection with FIG. 4, the at least one object may include a vehicle or a pedestrian. In some embodiments, the processing device 112 may identify the at least one object in the at least one image based on at least one feature (e.g., a shape, a size) of the at least one object. In some embodiments, the processing device 112 may identify the at least one object according to an object recognition algorithm (e.g., a Region-Convolutional Neural Network (R-CNN), a Scale Normalization for Image Pyramids (SIPN), a Detection with Enriched Semantics (DES), a Scale-Transferrable Detection Network (STDN)).

In 1240, the processing device 112 (e.g., the monitoring module 1140) (e.g., the processing circuits of the processor 220) may monitor a traffic behavior of the at least one object based on the predetermined traffic rule. As used herein, the traffic behavior may include "walking," "moving," "turning around," "stop," or the like, or a combination thereof.

In some embodiments, the processing device 112 may determine status information associated with the at least object based on the at least one image. The status information associated with the at least object may include a type of the at least one object, location information of the at least one object, velocity information of the at least one object, a moving path of the at least one object, a moving direction of the at least one object, or the like, or any combination thereof. Further, the processing device 112 may monitor the traffic behavior of the at least one object based on the status information according to the predetermined traffic rule. For example, as described in connection with FIG. 4, the processing device 112 may monitor the traffic behavior of the at least one object by comparing the status information associated with the at least object with the predetermined traffic rule. More descriptions regarding monitoring the traffic behavior may be found elsewhere in the present disclosure (e.g., FIG. 15 and the description thereof).

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, one or more other optional operations (e.g., a storing operation) may be added elsewhere in the process 1200. In the storing operation, the processing device 112 may store information and/or data (e.g., the predetermined region, the at least one image associated with the predetermined region) associated with the traffic monitoring in a storage device (e.g., the storage device 150) disclosed elsewhere in the present disclosure. As another example, operation 1210 and operation 1220 may be combined into a single operation in which the processing device 112 may both obtain the at least one image associated with the predetermined region and the predetermined traffic rule associated with the predetermined region.

Figure 13:
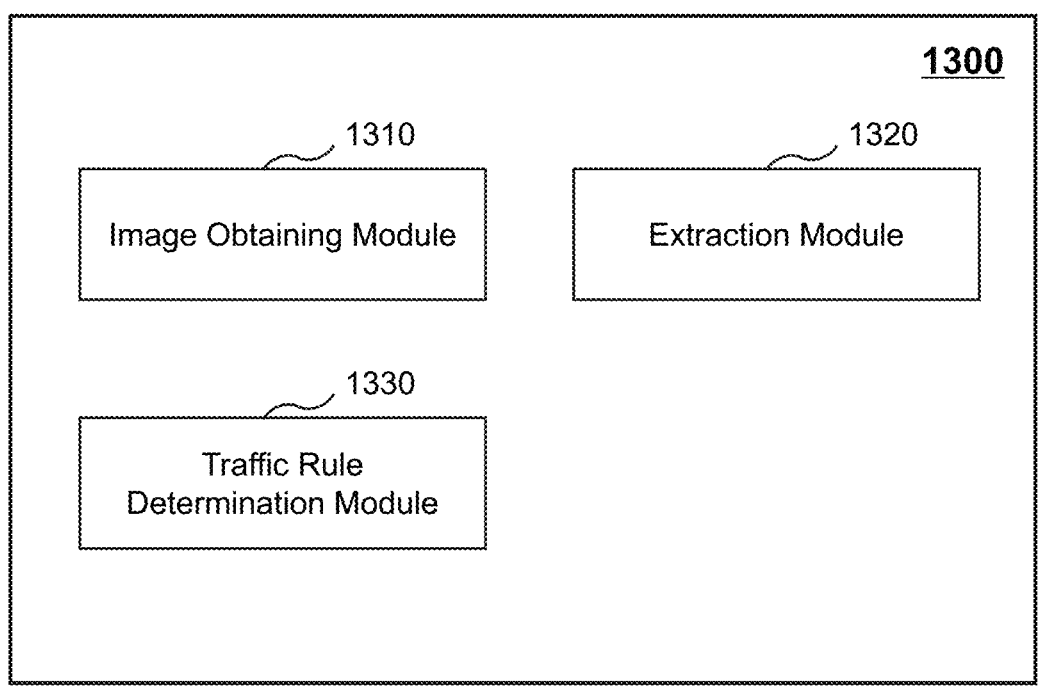
FIG. 13 is a block diagram illustrating an exemplary traffic rule generation device according to some embodiments of the present disclosure.

FIG. 13 is a block diagram illustrating an exemplary traffic rule generation device according to some embodiments of the present disclosure. The traffic rule generation device 1300 may include an image obtaining module 1310, an extraction module 1320, and a traffic rule determination module 1330. In some embodiments, one or more components of the traffic rule generation device 1300 may be integrated into the processing device 112.

The image obtaining module 1310 may be configured to obtain one or more predetermined images associated with a predetermined region captured by a capture device.

The extraction module 1320 may be configured to extract one or more traffic signs in the one or more predetermined images.

The traffic rule determination module 1330 may be configured to determine a predetermined traffic rule associated with the predetermined region based on the one or more traffic signs.

The modules in the traffic rule generation device 1300 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined as a single module, and any one of the modules may be divided into two or more units.

Figure 14:
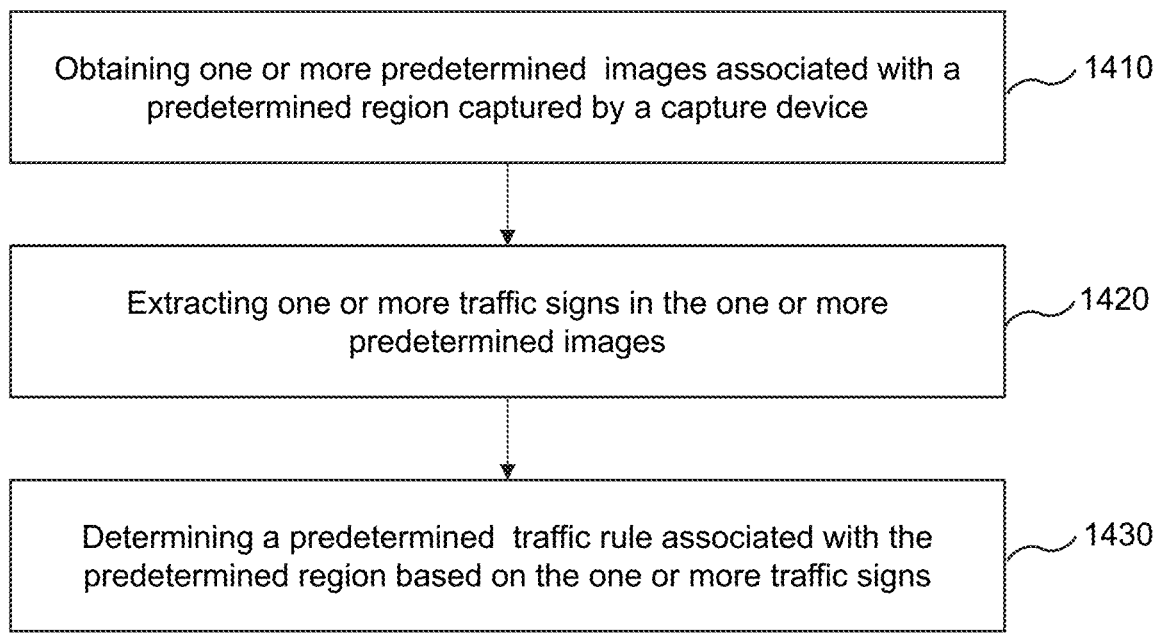
FIG. 14 is a flowchart illustrating an exemplary process for determining a predetermined traffic rule according to some embodiments of the present disclosure.

FIG. 14 is a flowchart illustrating an exemplary process for determining a predetermined traffic rule according to some embodiments of the present disclosure. In some embodiments, the process 1400 may be implemented as a set of instructions (e.g., an application) stored in the storage ROM 230 or RAM 240. The processor 220 and/or the modules in FIG. 13 may execute the set of instructions, and when executing the instructions, the processor 220 and/or the modules may be configured to perform the process 1400. The operations of the illustrated process presented below are intended to be illustrative. In some embodiments, the process 1400 may be accomplished with one or more additional operations not described and/or without one or more of the operations herein discussed. Additionally, the order in which the operations of the process as illustrated in FIG. 14 and described below is not intended to be limiting.

In 1410, the traffic rule generation device 1300 (e.g., the image obtaining module 1310) may obtain one or more predetermined images associated with a predetermined region captured by a capture device (e.g., camera).

In some embodiments, the traffic rule generation device 1300 may obtain the one or more predetermined images captured by the capture device in real-time. In some embodiments, the traffic rule generation device 1300 may obtain the one or more predetermined images stored in the storage device 150.

In 1420, the traffic rule generation device 1300 (e.g., the extraction module 1320) may extract one or more traffic signs in the one or more predetermined images. As described in connection with FIG. 4, the one or more traffic signs may include a lane line, an indicator sign, a color of a traffic light, a speed limit sign, or the like, or any combination thereof.

In 1430, the traffic rule generation device 1300 (e.g., the traffic rule determination module 1330) may determine a predetermined traffic rule associated with the predetermined region based on the one or more traffic signs.

As described in connection with FIG. 12, the predetermined traffic rule may refer to a rule or a regulation associated with a road (or a region) that an object (e.g., a vehicle, a pedestrian) on the road (or in the region) must follow. For example, the traffic rule may be "stop at a red light," "go at a green light (i.e., a prescribed moving time period)," "a speed limit associated with a specific region (e.g., an intersection)," "a speed limit associated with a specific road (e.g., a highway)," "a prescribed moving direction associated with a specific road (e.g., a one-way)," "a prescribed moving region associated with a specific region (e.g., an intersection)," "a moving rule (e.g., lane change allowed, no lane change) associated with a specific region," "a prescribed vehicle type associated with a specific lane (e.g., a motor vehicle lane, a non-motor vehicle lane)," "a prescribed parking region," etc.

In some embodiments, the traffic rule generation device 1300 may obtain feature information (e.g., a color of a traffic light, a speed limit value in the speed limit sign, a moving direction indicated in the indicator sign, a type (e.g., a dotted line, a solid line) of the lane line) included in the one or more traffic signs. Further, the traffic rule generation device 1300 may determine the predetermined traffic rule associated with the predetermined region based on the feature information. For example, the traffic rule generation device 1300 may determine a speed limit associated with the predetermined region based on the speed limit value. As another example, the traffic rule generation device 1300 may determine a moving rule (e.g., lane change allowed, no lane change) associated with the predetermined region based on the type of the lane line.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 15:
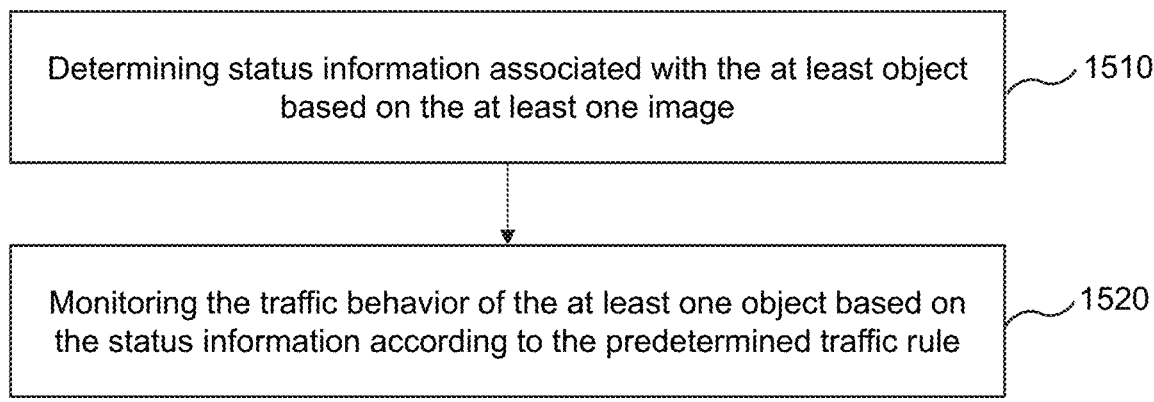
FIG. 15 is a flowchart illustrating an exemplary process for monitoring a traffic behavior of at least one object according to some embodiments of the present disclosure.

FIG. 15 is a flowchart illustrating an exemplary process for monitoring a traffic behavior of at least one object according to some embodiments of the present disclosure. In some embodiments, the process 1500 may be implemented as a set of instructions (e.g., an application) stored in the storage ROM 230 or RAM 240. The processor 220 and/or the modules in FIG. 11 may execute the set of instructions, and when executing the instructions, the processor 220 and/or the modules may be configured to perform the process 1500. The operations of the illustrated process presented below are intended to be illustrative. In some embodiments, the process 1500 may be accomplished with one or more additional operations not described and/or without one or more of the operations herein discussed. Additionally, the order in which the operations of the process as illustrated in FIG. 15 and described below is not intended to be limiting.

In 1510, the processing device 112 (e.g., the monitoring module 1140) (e.g., the processing circuits of the processor 220) may determine status information associated with the at least object based on the at least one image.

As used herein, the status information associated with the at least object may include a type (e.g., a motor vehicle, a non-motor vehicle) of the at least one object, location information of the at least one object, velocity information of the at least one object, a moving path of the at least one object, a moving direction of the at least one object, or the like, or any combination thereof.

In 1520, the processing device 112 (e.g., the monitoring module 1140) (e.g., the processing circuits of the processor 220) may monitor the traffic behavior of the at least one object based on the status information according to the predetermined traffic rule.

In some embodiments, for each of the at least one object, the processing device 112 may determine whether the traffic behavior of the object violates the predetermined traffic rule based on the status information of the object. For example, it is assumed that a traffic light at an intersection is "red," that is, the predetermined traffic rule is "stop at the red light," the processing device 112 may determine a velocity of the object is less than a threshold (e.g., 0.1 m/s, 0.5 m/s) based on the velocity information of the object. In response to determining that the velocity of the object is larger than or equal to the threshold, the processing device 112 may determine that the traffic behavior of the object violates the predetermined traffic rule. As another example, the processing device 112 may compare the velocity of the object (e.g., a vehicle) with "a speed limit for the predetermined region." If the velocity of the object is equal to or higher than the speed limit for the predetermined region, the processing device 112 may determine that the traffic behavior of the object violates the predetermined traffic rule.

In response to determining that the traffic behavior of the object violates the predetermined traffic rule, the processing device 112 may transmit event information associated with the traffic behavior of the object to a target device. As used herein, the event information associated with the traffic behavior of the object may include at least one image corresponding to the object, the status information of the object, location information associated with the predetermined region, a traffic violation type (e.g., illegal parking, over speeding, running a red light), or the like, or any combination thereof. In some embodiments, the target device may include a traffic management department (e.g., a road and traffic authority, a traffic police brigade), a data center, an alarm center, a terminal device (e.g., the user device 140) associated with the object, or the like, or any combination thereof.

In some embodiments, for each of the at least one object, the processing device 112 may determine whether the traffic behavior of the object satisfies a predetermined condition based on the status information according to the predetermined traffic rule. For example, the processing device 112 may determine whether a difference between a velocity of the object (e.g., a vehicle) and the speed limit is less than a difference threshold (it is assumed that the velocity of the object is lower than the speed limit). The difference threshold may be a default setting of the traffic monitoring system 100 or may be adjustable under different situations. In response to determining that the difference between the velocity of the object and the speed limit is less than the difference threshold, the processing device 112 may determine that the traffic behavior of the object satisfies the predetermined condition.

In response to determining that the traffic behavior of the object satisfies the predetermined condition, the processing device 112 may transmit reminder information (e.g., "the speed limit is 90 km/h, the current speed is 88 km/h, please slow down") to the terminal device (e.g., the user device 140) associated with the object. The reminder information may include a current status (e.g., a current moving speed, a current location, a current moving direction) of the object, a moving recommendation, or the like, or a combination thereof. After receiving the reminder information, the terminal device may display the reminder information via an interface in a form of text, graphics, audio, video, etc.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 16:
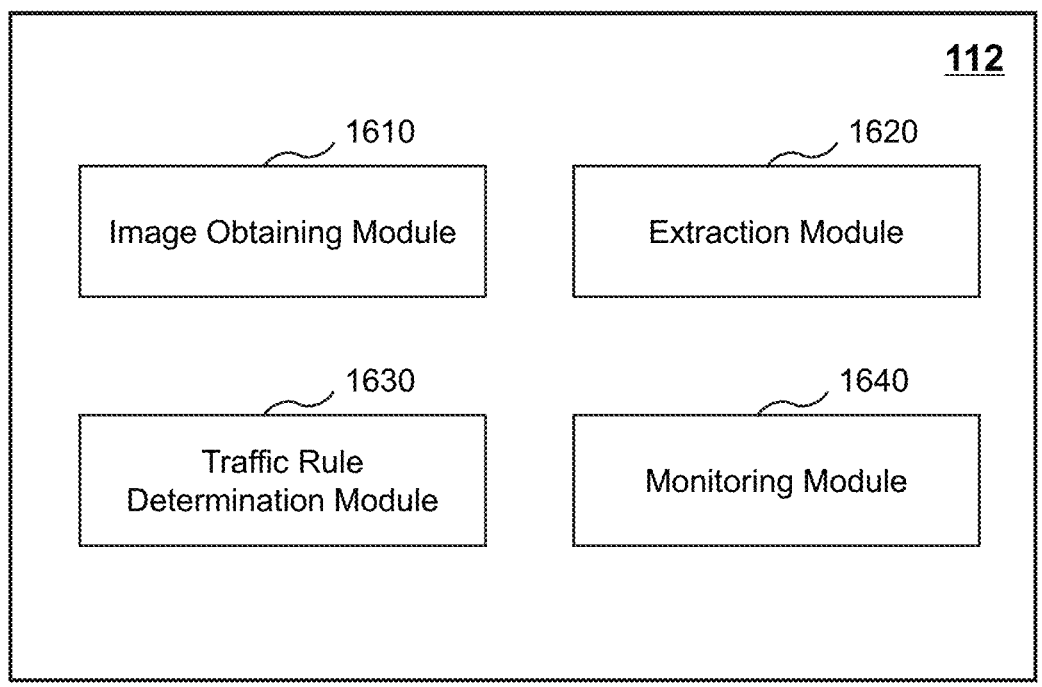
FIG. 16 is a block diagram illustrating an exemplary processing device according to some embodiments of the present disclosure.

FIG. 16 is a block diagram illustrating an exemplary processing device according to some embodiments of the present disclosure. The processing device 112 may include an image obtaining module 1610, an extraction module 1620, a traffic rule determination module 1630, and a monitoring module 1640.

The image obtaining module 1610 may be configured to obtain at least one image (e.g., a static image, a video frame) associated with a predetermined region captured by a capture device (e.g., the acquisition device 130).

The extraction module 1620 may be configured to extract one or more traffic signs in the at least one image.

The traffic rule determination module 1630 may be configured to determine a traffic rule based on the one or more traffic signs.

The monitoring module 1640 may be configured to monitor a traffic behavior of at least one object associated with the predetermined region based on the traffic rule. In some embodiments, the monitoring module 1640 may determine status information associated with the at least one object based on the at least one image. Further, the monitoring module 1640 may monitor the traffic behavior of the at least one object based on the status information according to the traffic rule.

The modules in the processing device 112 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined as a single module, and any one of the modules may be divided into two or more units. For example, the image obtaining module 1610 and the first obtaining module 1110 illustrated in FIG. 11 may be combined as a single module. As another example, the monitoring module 1640 and the monitoring module 1140 illustrated in FIG. 11 may be combined as a single module.

Figure 17:
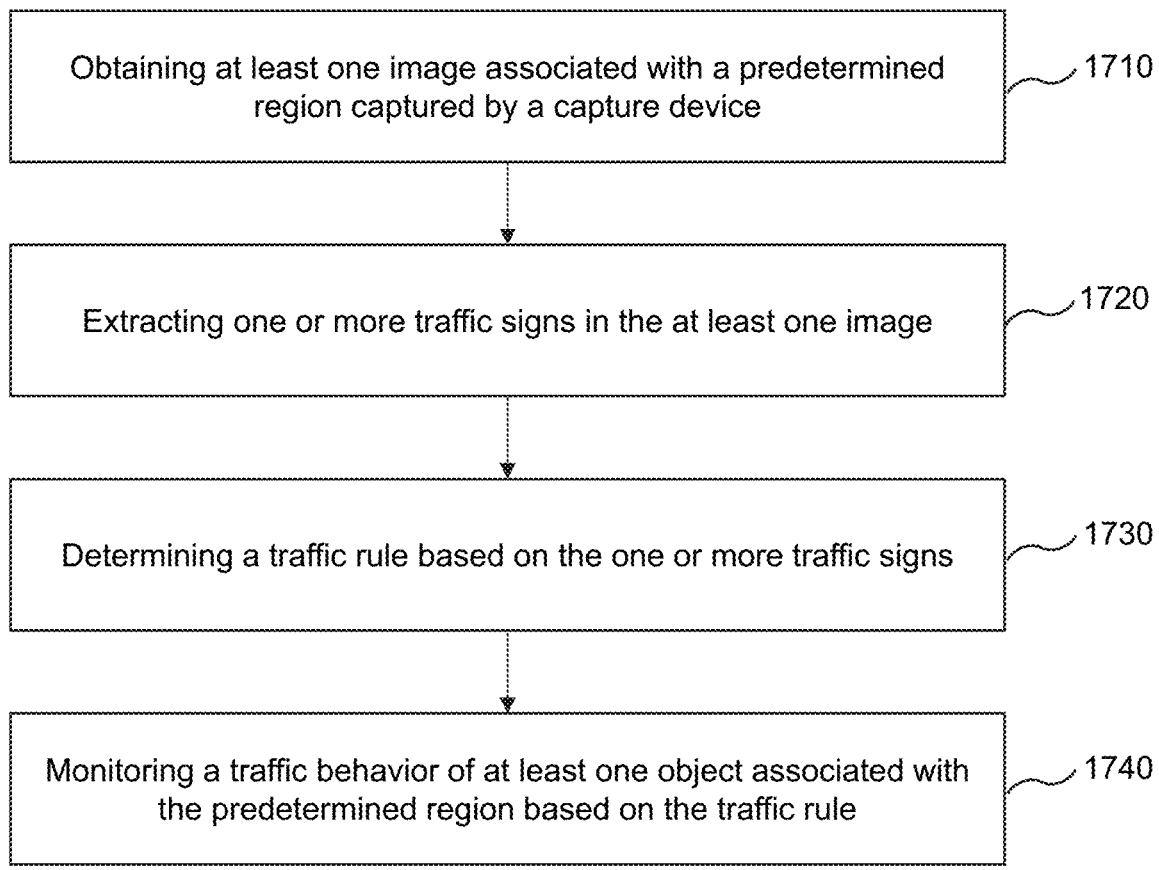
FIG. 17 is a flowchart illustrating another exemplary process for object monitoring according to some embodiments of the present disclosure.

FIG. 17 is a flowchart illustrating another exemplary process for object monitoring according to some embodiments of the present disclosure. In some embodiments, the process 1700 may be implemented as a set of instructions (e.g., an application) stored in the storage ROM 230 or RAM 240. The processor 220 and/or the modules in FIG. 15 may execute the set of instructions, and when executing the instructions, the processor 220 and/or the modules may be configured to perform the process 1700. The operations of the illustrated process presented below are intended to be illustrative. In some embodiments, the process 1700 may be accomplished with one or more additional operations not described and/or without one or more of the operations herein discussed. Additionally, the order in which the operations of the process as illustrated in FIG. 17 and described below is not intended to be limiting.

In 1710, the processing device 112 (e.g., the image obtaining module 1610) (e.g., the interface circuits of the processor 220) may obtain at least one image (e.g., a static image, a video frame) associated with a predetermined region captured by a capture device (e.g., the acquisition device 130). As described in connection with FIG. 12, the processing device 112 may obtain the at least one image from the capture device or a storage device (e.g., the storage device 150).

In 1720, the processing device 112 (e.g., the extraction module 1620) (e.g., the processing circuits of the processor 220) may extract one or more traffic signs in the at least one image. As described in connection with FIG. 4, the one or more traffic signs may include a lane line, an indicator sign, a color of a traffic light, a speed limit sign, or the like, or any combination thereof.

In 1730, the processing device 112 (e.g., the traffic rule determination module 1630) (e.g., the processing circuits of the processor 220) may determine a traffic rule based on the one or more traffic signs. As described in connection with FIG. 14, the traffic rule may refer to a rule or a regulation associated with a road (or a region) that an object (e.g., a vehicle, a pedestrian) on the road (or in the region) must follow.

In 1740, the processing device 112 (e.g., the monitoring module 1640) (e.g., the processing circuits of the processor 220) may monitor a traffic behavior of at least one object associated with the predetermined region based on the traffic rule.

In some embodiments, the processing device 112 may determine status information associated with the at least one object based on the at least one image. Further, the processing device 112 may monitor the traffic behavior of the at least one object based on the status information according to the traffic rule. For example, for each of the at least one object, the processing device 112 may determine whether the traffic behavior of the object violates the traffic rule based on the status information of the object. In response to determining that the traffic behavior of the object violates the traffic rule, the processing device 112 may transmit event information (e.g., at least one image corresponding to the object, status information of the object, location information associated with the predetermined region, a traffic violation type) associated with the traffic behavior of the object to a target device. As another example, for each of the at least one object, the processing device 112 may determine whether the traffic behavior of the object satisfies a predetermined condition based on the status information according to the traffic rule. In response to determining that the traffic behavior of the object satisfies the predetermined condition, the processing device 112 may transmit reminder information (e.g., a current status of the object, a moving recommendation) to a terminal device associated with the object.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

In some embodiments, the present disclosure may also provide a storage medium storing a computer program thereon. When executed by a processor, the computer program may direct the processor to perform a process (e.g., process 400, process 700, process 1200, process 1400, process 1500, process 1700) described elsewhere in the present disclosure. As used herein, the storage medium may include but not limited to a U disk, a read-only memory (ROM), a random access memory (RAM), a mobile hard disk, a disk, an optical disk, or the like, or any combination thereof.

In some embodiments, the present disclosure may also provide an electronic device including a processor and a storage, wherein the storage stores a computer program. When executed by a processor, the computer program may direct the processor to perform a process (e.g., process 400, process 700, process 1200, process 1400, process 1500, process 1700) described elsewhere in the present disclosure. In some embodiments, the electronic device may further include a transmission device and an input/output device connected to the processor.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer-readable program code embodied thereon.

A computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in a combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations thereof, are not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

We claim:

1. A system for object monitoring, comprising:
    at least one storage medium including a set of instructions; and
    at least one processor in communication with the at least one storage medium, wherein when executing the set of instructions, the at least one processor is directed to cause the system to:
        obtain multimedia information associated with a predetermined region captured by a capture device, the multimedia information including at least one image associated with the predetermined region, at least one video associated with the predetermined region, acoustic information, and text information;

obtain a predetermined traffic rule associated with the predetermined region, wherein the predetermined traffic rule is determined based on the multimedia information associated with the predetermined region;

identify at least one object in the multimedia information, the at least one object including a vehicle and a pedestrian;

determine status information associated with the at least object based on the multimedia information, the status information including location information of the at least one object; and monitor a traffic behavior of the at least one object based on the status information according to the predetermined traffic rule, wherein the at least one processor is directed to cause the system further to:

determine whether the pedestrian is on a motor vehicle lane according to a prescribed moving region and location information of the pedestrian.

2. The system of claim 1, wherein the capture device includes at least one of a camera, a video recorder, or a sensor.

3. The system of claim 1, wherein to obtain the predetermined traffic rule associated with the predetermined region, the at least one processor is directed to cause the system to:

extract one or more traffic signs in the multimedia information associated with the predetermined region, the one or more traffic signs including at least one of a lane line, an indicator sign, a color of a traffic light, or a speed limit sign, the indicator sign including an indicator sign indicating sound honk; and determine the predetermined traffic rule associated with the predetermined region based on the one or more traffic signs.

4. The system of claim 1, wherein the status information associated with the at least object includes a type of the at least one object, velocity information of the at least one object, a moving path of the at least one object, or a moving direction of the at least one object.

5. The system of claim 4, in response to determining that the at least one object is the vehicle, the at least one processor being directed to cause the system further to:

determine sizes of the vehicle in different locations of the multimedia information according to a type of the vehicle and a location of the vehicle in the multimedia information associated with the predetermined region.

6. The system of claim 4, wherein the at least one processor is directed to cause the system further to:

determine whether a congestion occurs in the predetermined region according to velocity information of a plurality of vehicles in the predetermined region.

7. The system of claim 4, in response to determining that the at least one object is the vehicle, the at least one processor being directed to cause the system further to:

determine a relationship between pixel distance information in the multimedia information and actual distance information based on a type of the vehicle.

8. The system of claim 1, wherein to monitor the traffic behavior of the at least one object based on the status information according to the predetermined traffic rule, the at least one processor is directed to cause the system further to:

for each of the at least one object, determine whether the traffic behavior of the object violates the predetermined traffic rule based on the status information of the object; and in response to determining that the traffic behavior of the object violates the predetermined traffic rule, transmit event information associated with the traffic behavior of the object to a target device.

9. The system of claim 8, wherein the event information associated with the traffic behavior of the object includes at least one image corresponding to the object, the status information of the object, location information associated with the predetermined region, or a traffic violation type.

10. The system of claim 8, wherein the target device includes at least one of a traffic management department, a data center, an alarm center, or a terminal device associated with the object.

11. The system of claim 1, wherein to monitor the traffic behavior of the at least one object based on the status information according to the predetermined traffic rule, the at least one processor is directed to cause the system further to:

for each of the at least one object, determine whether the traffic behavior of the object satisfies a predetermined condition based on the status information according to the predetermined traffic rule; and in response to determining that the traffic behavior of the object satisfies the predetermined condition, transmit reminder information to a terminal device associated with the object.

12. The system of claim 1, wherein the at least one processor is directed to cause the system further to:

store the multimedia information associated with the predetermined region into a storage device according to a predetermined time interval.

13. A system for object monitoring, comprising:

at least one storage medium including a set of instructions; and at least one processor in communication with the at least one storage medium, wherein when executing the set of instructions, the at least one processor is directed to cause the system to:

obtain multimedia information associated with a predetermined region captured by a capture device, the multimedia information including at least one image associated with the predetermined region, at least one video associated with the predetermined region, acoustic information, and text information;

extract one or more traffic signs in the multimedia information;

determine a traffic rule based on the one or more traffic signs;

identify at least one object in the multimedia information, the at least one object including a vehicle and a pedestrian;

determine status information associated with the at least object based on the multimedia information, the status information including location information of the at least one object; and monitor a traffic behavior of the at least one object based on the status information according to the predetermined traffic rule, wherein the at least one processor is directed to cause the system further to:

determine whether the pedestrian is on a motor vehicle lane according to a prescribed moving region and location information of the pedestrian.

14. A method implemented on a computing device including at least one processor, at least one storage medium, and a communication platform connected to a network, the method comprising:
- obtaining multimedia information associated with a predetermined region captured by a capture device, the multimedia information including at least one image associated with the predetermined region, at least one video associated with the predetermined region, acoustic information, and text information;
- obtaining a predetermined traffic rule associated with the predetermined region, wherein the predetermined traffic rule is determined based on the multimedia information associated with the predetermined region;
- identifying at least one object in the multimedia information, the at least one object including a vehicle and a pedestrian;
- determining status information associated with the at least object based on the multimedia information, the status information including location information of the at least one object; and
- monitoring a traffic behavior of the at least one object based on the status information according to the predetermined traffic rule, comprising:
- determining whether the pedestrian is on a motor vehicle lane, according to a prescribed moving region and location information of the pedestrian.

15. The method of claim 14, wherein the capture device includes at least one of a camera, a video recorder, or a sensor.

16. The method of claim 14, wherein the obtaining the predetermined traffic rule associated with the predetermined region includes:
- extracting one or more traffic signs in the multimedia information associated with the predetermined region, the one or more traffic signs including at least one of a lane line, an indicator sign, a color of a traffic light, or a speed limit sign, the indicator sign including an indicator sign indicating sound honk; and
- determining the predetermined traffic rule associated with the predetermined region based on the one or more traffic signs.

17. The method of claim 14, wherein the status information associated with the at least object includes a type of the at least one object, velocity information of the at least one object, a moving path of the at least one object, or a moving direction of the at least one object.

18. The method of claim 14, wherein the monitoring the traffic behavior of the at least one object based on the status information according to the predetermined traffic rule includes:
- for each of the at least one object,
  - determining whether the traffic behavior of the object violates the predetermined traffic rule based on the status information of the object; and
  - in response to determining that the traffic behavior of the object violates the predetermined traffic rule, transmitting event information associated with the traffic behavior of the object to a target device.

* * * * *